United States Patent [19]

Tarczy-Hornoch

[11] 4,241,416
[45] Dec. 23, 1980

[54] MONITORING APPARATUS FOR PROCESSOR CONTROLLED EQUIPMENT

[75] Inventor: Zoltan Tarczy-Hornoch, Berkeley, Calif.

[73] Assignee: Systron-Donner Corporation, Concord, Calif.

[21] Appl. No.: 812,385

[22] Filed: Jul. 1, 1977

[51] Int. Cl.³ ............................................. G06F 11/30
[52] U.S. Cl. ..................................... 364/900; 371/16
[58] Field of Search ... 364/900 MS File, 200 MS File; 235/302, 304, 304.1; 324/73 R, 73 AT, 72.5; 371/16, 20, 24, 25, 26, 27, 67

[56] References Cited

U.S. PATENT DOCUMENTS

| | | | |
|---|---|---|---|
| 3,343,141 | 9/1967 | Hackl | 364/200 |
| 3,579,199 | 5/1971 | Anderson et al. | 364/200 |
| 3,646,519 | 2/1972 | Wollum et al. | 235/304 |
| 3,673,397 | 6/1972 | Schaefer | 235/302 |
| 3,688,263 | 8/1972 | Balogh, Jr. et al. | 364/200 |
| 3,739,160 | 6/1973 | El-Hasan et al. | 324/73 AT X |
| 3,771,131 | 11/1973 | Ling | 364/200 |
| 3,813,531 | 5/1974 | King et al. | 235/304.1 |
| 3,825,901 | 7/1974 | Golnek, Sr. et al. | 364/200 |
| 3,831,149 | 8/1974 | Job | 364/900 |
| 3,832,535 | 8/1974 | De Vito | 324/73 AT |
| 3,873,819 | 3/1975 | Greenwald | 235/304 |
| 3,906,454 | 9/1975 | Martin | 364/200 |
| 3,967,103 | 6/1976 | Cachuela et al. | 324/73 R |
| 3,988,603 | 10/1976 | Griffin | 324/73 R X |
| 4,039,814 | 8/1977 | Saint-Hilaire et al. | 235/302 |
| 4,048,481 | 9/1977 | Bailey, Jr. et al. | 364/200 X |
| 4,063,081 | 12/1977 | Handly et al. | 364/200 X |
| 4,066,883 | 1/1978 | Wheeler, Jr. | 235/304 |
| 4,070,565 | 1/1978 | Borrelli | 324/73 R X |
| 4,099,668 | 7/1978 | Feilchenfeld et al. | 235/304 |

*Primary Examiner*—Melvin B. Chapnick
*Attorney, Agent, or Firm*—Flehr, Hohbach, Test, Albritton & Herbert

[57] ABSTRACT

A microprocessor monitor or analyzer used as a test and troubleshooting tool for both the software and hardware of microprocessor based equipment. The analyzer is usable with all microprocessor families having accessible or reconstructible address and data busses up to 16 bits wide each. It has search modes that find and identify the first and last instruction in a program loop. A transfer mode permits stepping forward or backward through programs without setting addresses. It can be used as a passive real time address and data bus monitor or as an interactive break point generator. After a match address is encountered, strobing and storing of the address and data bus content can be delayed by a preset number of machine cycles, instruction cycles, loop cycles (loop being the repetitive execution of the same instruction) or combinations of these delays. After a halt or break, the processor can be stepped in single or multiple step increments according to the above cycles. There is provision for the interconnection of several such analyzers if a wider address or data match and display or complex arming and strobing sequence is required.

23 Claims, 15 Drawing Figures

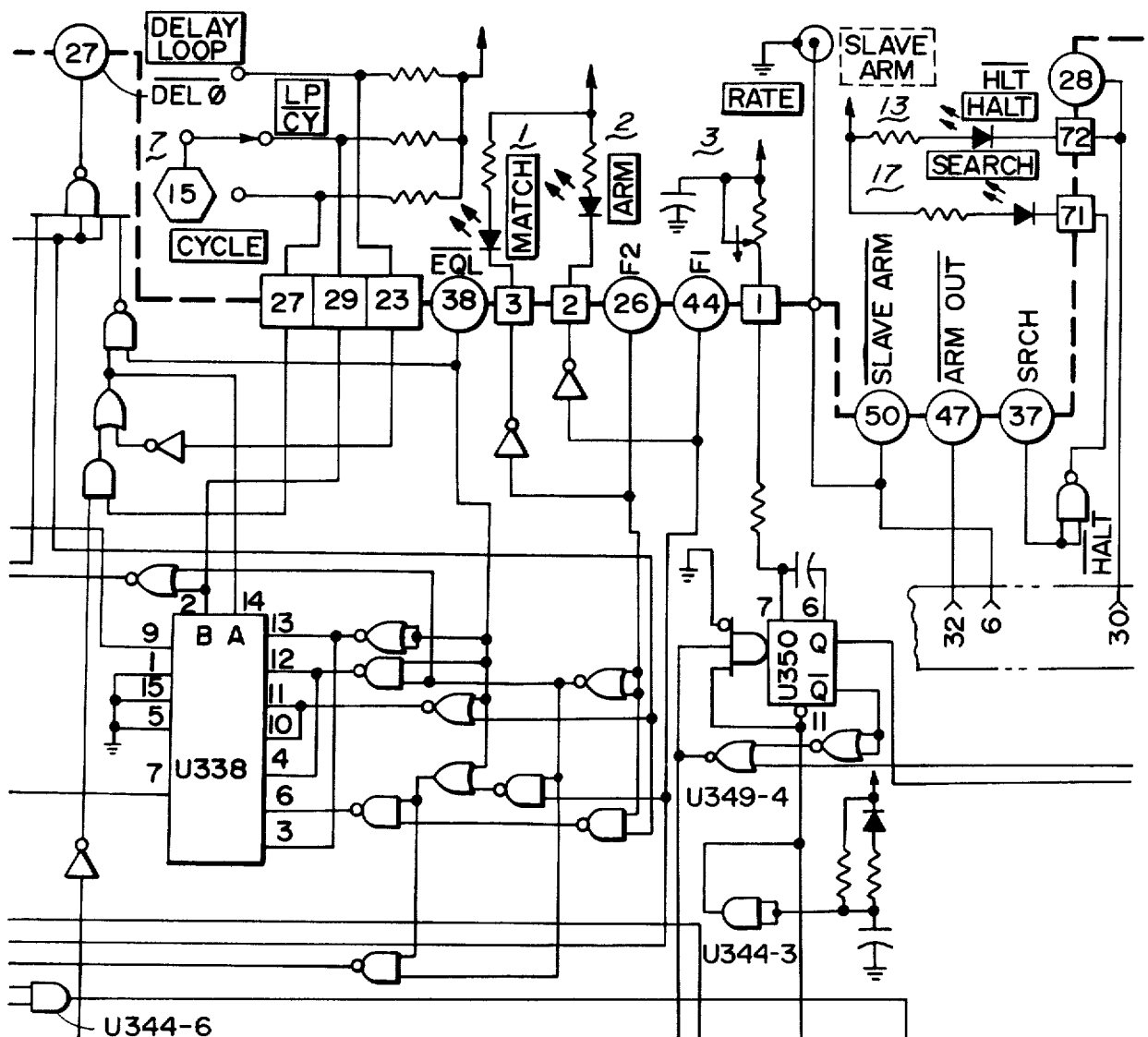
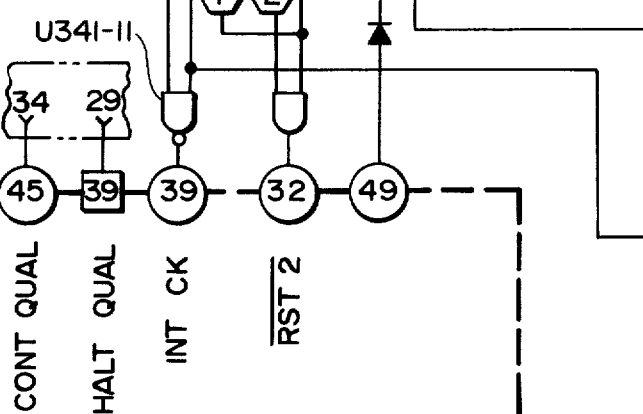
FIG. 4b

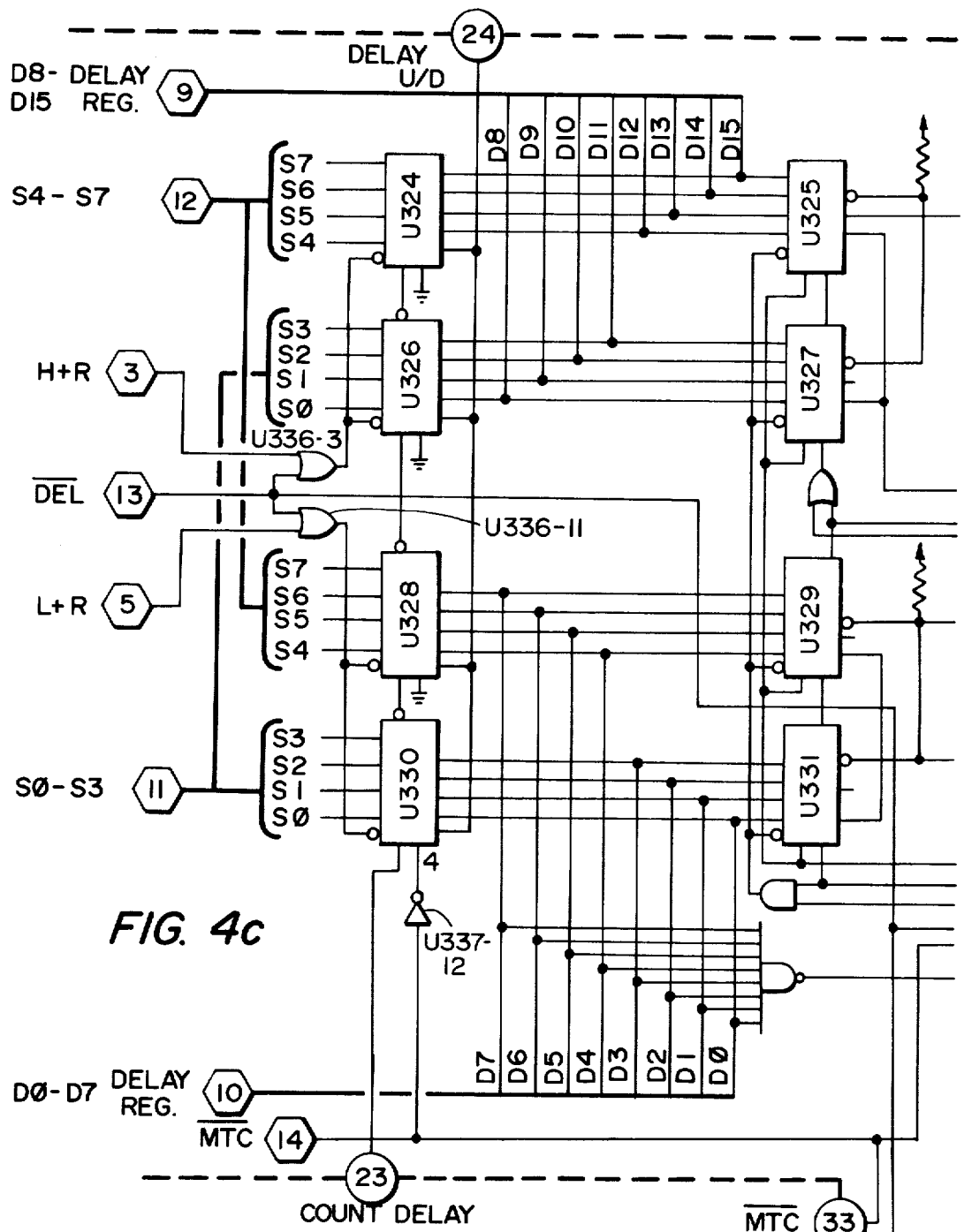
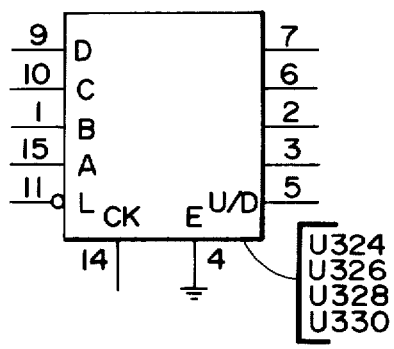
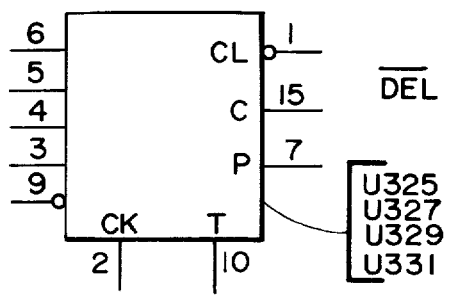
FIG. 4c

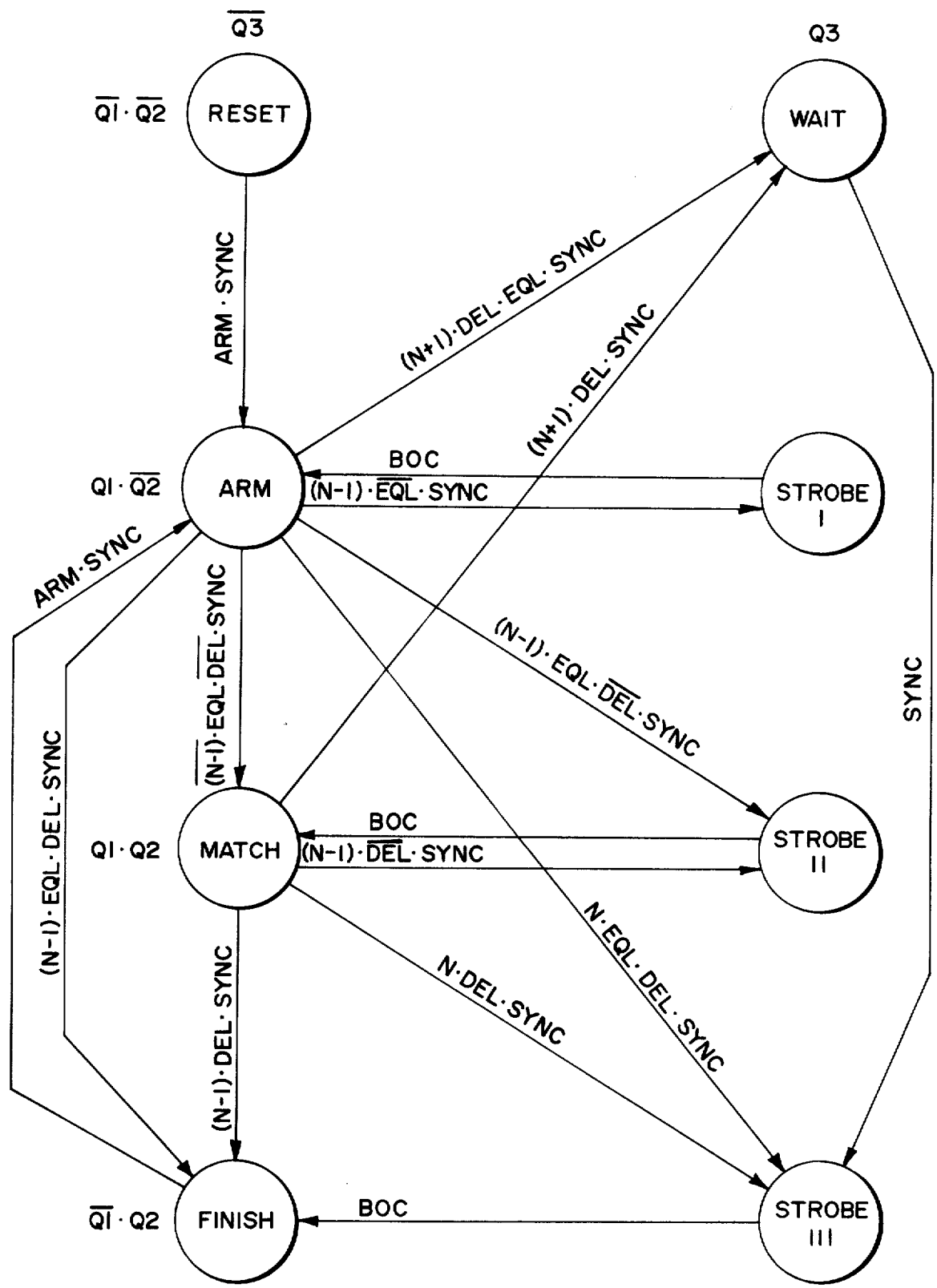
FIG. 6  STATE DIAGRAM

PROGRAM 2. FLOW CHART

MONITORING APPARATUS FOR PROCESSOR CONTROLLED EQUIPMENT

BACKGROUND OF THE INVENTION

The present invention is directed to a microprocessor analyzer.

Microprocessors ($\mu$P) differ from ordinary computers in many significant ways. In a microprocessor the program is typically in read only memory (ROM) and not normally editable especially in a field environment. Important signal points such as flag bits or internal register contents are mechanically and electrically inaccessible.

In contrast, in a normal computer every significant point is accessible. Also there are software routines available to manipulate the computer operation during testing and troubleshooting via a console or terminal.

Thus in analyzing or testing the hardware and software of a typical computer a software approach can be used. But microprocessor testing requires a hardware approach: a new kind of instrument easily attachable to a microprocessor, able to monitor address and data busses, trace program execution and hardware operation passively, or control the microprocessor operation in an interactive mode.

In the past logic analyzers have been used to test microprocessor based systems. These are essentially multitrace oscilloscopes capable of displaying typically up to 16 channels of data in timing diagram or bit pattern form for N steps preceding or following a reference trigger point.

None of the prior art devices have flexibility or capability of detecting errors which are deeply buried in, for example, the multiple nested loops, subroutines, etc. of contemporary microprocessor programs; neither are they capable to operate interactively with a microprocessor.

OBJECTS AND SUMMARY OF THE INVENTION

It is, therefore, a general object of the present invention to provide an improved microprocessor analyzer.

It is another object to provide an analyzer which is universal in being able to test almost any type of microprocessor.

It is another object to provide an analyzer which is especially suited for testing deeply nested microprocessor programs.

It is another object to provide an analyzer which does not require a detailed knowledge of the associated microprocessor program for effective troubleshooting.

In accordance with the above objects there is provided apparatus for analyzing bus oriented multistate digital devices having timing cycles. Memory means are provided. Register means store a first bit pattern and first and second numbers. Controller means include comparator means for recognizing, by emitting an output signal, when the bit pattern stored in the first register means matches the bit pattern on the bus of the digital device. The controller means includes counting means causing the counting of the number of the output signals until it equals the first number and thereafter causing the counting of the number of the timing cycles until it equals the second number. The controller means then strobes the memory means to store at least one additional bit pattern representative of at least one state of the digital device. Means are provided for halting the operation of the digital device at the time of strobing, display means for displaying the equivalent of the additional bit pattern and means for transferring at least a portion of the contents of the memory means into the register means on external command. Means change the first bit pattern by a predetermined amount in accordance with the output of the comparator means together with means for repeating the process of recognizing at a predetermined rate.

BRIEF DESCRIPTION OF THE DRAWINGS

FIGS. 3a-d, 4a-c, and 5a-c are detailed circuit schematics of FIG. 2 with the numbers in circles, squares and hexagons showing interconnections between the figures;

FIG. 6 is a state diagram of FIGS. 5a-5c showing the eight possible states of its sequential controller;

DETAILED DESCRIPTION OF THE PREFERRED EMBODIMENT

General Description

Figure 1:
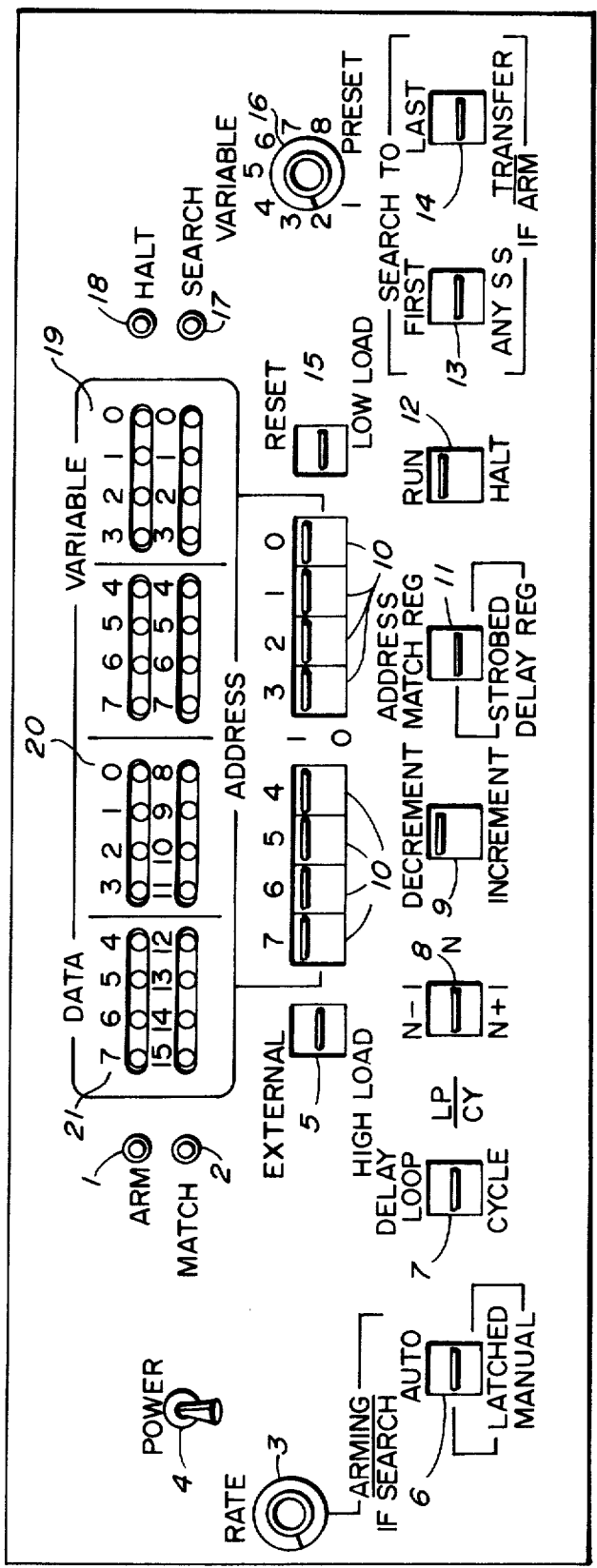
FIG. 1 shows the front control panel of the analyzer.

The operation of the analyzer can be described with reference to four 16 bit wide internal registers. There is a match register, the content of which is continually compared with the address bus. If, after arming, a match occurs, a delay period starts. The content of the delay register specifies how many cycles, in the simplest case clock cycles, have to pass before a strobe signal is generated. At strobe time the momentary bit patterns of the 16 bit each data and address bus are latched into the address and data registers, and are immediately displayed on binary LEDs. If the data bus is only 8 bits wide, the data bus contents can be latched in two bytes at two variable strobe times to catch different microcycles, or different bytes of multibyte instructions. In the embodiment shown either the machine cycle rate or the instruction cycle rate can vary from 0 to 4 MHz, and up to 8 clock cycles can be captured and displayed within a machine or instruction cycle.

Both the match and delay registers can be set, reset, incremented, decremented, and displayed independently with the front controls. The content of the delay register can specify up to 65,000 clock cycle delays, machine cycle delays, instruction cycle delays or loop delays. The loop delay specifies how many times the given match address has to be executed before strobe occurs. Also, there is a combination delay: $N_1$ loops followed by $N_2$ clocks or instruction cycles before strobe. This can be used, for example, when tracing the exit from a loop after $N_1$ executions. As stated, the address and data are captured at strobe time and displayed. The display can be latched to show one-shot phenomena or it may be repeatedly strobed at a variable rate. In the latched mode, manual or external arming can be accomplished.

The strobe can be advanced (N−1) or delayed (N+1) by one clock cycle to trace programs, especially jumps and subroutine calls forward and backward.

With additional memory larger, for example 256, address and data words can be captured before or after strobe. There is also a transfer pushbutton to load the content of the address display into the match register which permits the user to "walk through" the program branches without having to manually set the new starting addresses.

An additional feature of the analyzer is the search mode. For example if a processor is hung up in a program loop the search mode can find and display the current address and instructions. Also it will find the first and the last instructions of consecutively executed program segments. This mapping feature quickly identifies the executed sections of a program for diagnostic or verification purposes without tedious manual search. The search rate is variable. Any measurement in progress, such as a search, may be terminated by reset.

The operating modes described above are all passive. The processor has been operating at its own speed and under its own control. But there is provision, if the processor permits, to halt execution at strobe time and then to step the microprocessor and display the result under manual or variable rate automatic control. The step size can be selected as a single or multiple machine or instruction cycle, or a single or multiple loop or a combination of loops and cycles. The single step, or N+1 with transfer, and search modes can be combined very effectively to trace long program segments. There is an additional user definable front panel switch position which can operate interrupt and control lines or can be used to select instruction cycle vs. machine cycle operation.

On the front panel, status lights may show the operating status of the analyzer. The arm and match lights show the "reset", "armed and waiting for match", "waiting for delay", and "measurement complete" states. The search and halt lights show the related conditions respectively.

A rear panel connector receives interchangeable custom wired or universal user jumperable interface modules. These interface modules adapt the analyzer pin out to the various processors. Interchangeable cables can be used to connect the interface module to the processors. The easiest to use cable clips directly onto the processor chip. As an aid in hardware debugging a TTL compatible synch output pulse is provided on a rear panel BNC connector at strobe time.

Referring to FIG. 1, the front panel controls of the instrument perform the following functions:

| Front Panel, Microprocessor Analyzer (MPA) | | |
|---|---|---|
| Index | Name | Function |
| 1 | ARM (LED indicator lamp) | This indicator and the match (2) indicator display the four MPA internal operating states. See the table following Index 2. |
| 2 | MATCH (LED indicator lamp) | This indicator and the ARM (1) indicator display the four MPA internal operating states. See the following table. |

| Analyzer Internal Operating States | | |
|---|---|---|
| ARM lamp (1) | MATCH lamp (2) | MPA INTERNAL STATE |
| OFF | OFF | RESET - MPA will not respond to any inputs. |
| ON | OFF | MEASUREMENT IN PROGRESS - MPA is waiting for address match. |
| ON | ON | MEASUREMENT IN PROGRESS - MPA is waiting for delay to time out. |
| OFF | ON | MEASUREMENT is completed and displayed. |
| 3 | ARMING - RATE (potentiometer) | This control sets the wait time before rearming occurs when the arming switch (6) is in the auto position. Note: arming control (3) and switch (6) operate only if the search (17) lamp is off (if $\overline{SEARCH}$). Search rate is also controled with this pot. |
| 4 | POWER (toggle switch) | This switch, in the up position, applies ac power to the primary of the power transformer in the MPA. |
| 5 | EXTERNAL, HIGH LOAD (switch) | The external switch position is user defined. Typical uses are to reset or interrupt the processor, to switch in or invert timing qualifiers, or to select machine or instruction cycle delays, etc. The center position is off. The high load switch position is a momentary contact closure type with return to center which loads the address switches (10) register contents into the most significant 8 bits of a register selected by switch 11. |
| 6 | ARMING - AUTO LATCHED, MANUAL (switch) | The auto switch position continuly rearms the instrument a fixed time after completing each measurement. The time delay is adjusted by the rate, arming (3) control. The latched switch position retains the last displayed measurement indefinitely. The manual switch position is a momentary contact closure type with return to center (latched) which arms the instrument once for a new measurement. Note: Arming control (3) and switch (6) operate only if the search (17) lamp is off (If $\overline{SEARCH}$). |
| 7 | DELAY: LOOP LP, CYCLE (switch) CY | The loop switch position causes a delay, before display, measured in processor program loops. The LP switch position causes a loop CY delay set by the upper 8 bits of the delay register, followed by a cycle delay set by the lower 8 bits of the delay register. The cycle switch position causes a delay measured in processor cycles (machine or instruction). |
| 8 | N − 1, N + 1 (switch) | The N − 1 switch position causes the strobed address as selected by the address: strobed switch (11) position to be equal to the match register contents + the delay register contents − 1. The N switch position causes the strobed address as selected by the address: strobed switch (11) position to be equal to the match register contents + the delay register contents. The N + 1 switch position causes the strobed address as selected by the address: strobed switch (11) position to be equal to the match register contents + the delay register contents +1. |
| 9 | DECREMENT, INCREMENT | The decrement switch position is a momentary self centering contact |

| | | |
|---|---|---|
| | (switch) | which subtracts one from the contents of the register selected by the address: match reg. or address: delay reg. switch (11) positions and is shown in the address display. The increment switch position is a momentary self-centering contact which adds one to the contents of the register selected by the address: match reg. or the address: delay reg. switch positions. The register is shown in the address display (21). |
| 10 | ADDRESS Switch Register (switches) | These eight, two position switches allow a 0 (zero) or a 1 (one) to be entered into each of the bit positions in the eight bit register. These may be loaded into either the upper or lower 8 bits of the match register or the delay register. |
| 11 | ADDRESS: MATCH REG., STROBED, DELAY REG. (switch) | The match reg. switch position places the contents of the match register into the address display (21). The register contents may then be modified by the reset or low load (15) switch positions as well as the high load (5) position or by the increment/decrement (9) switch. The strobed switch position is necessary to operate the arming control (3) and switch (6). The strobed positioned also allows the address display (21) to contain the results when a measurement is completed. In this position, the decrement/increment switch (9) changes the delay register. Reset, low load (15) and high load (5) are inoperative. The delay reg. switch position places the contents of the delay register into the address display (21). The register contents may be then modified by the reset or low load (15) switch positions, as well as the high load (5) position or by the increment/ decrement (9) switch. |
| 12 | RUN, HALT (switch) | The run switch position deactivates the halt signal. The halt switch position activates the halt signal to the processor at strobe time. |
| 13 | SEARCH TO FIRST ANY/S.S. (switch) | The first switch position is a momentary contact closure type with return to center which strobes the first executing address after the address in the match register. Also terminates search to: last (14). The Any/s.s. switch position is a momentary contact closure type with return to center which strobes the currently executing address and data. With switch (12) in halt, any/s.s. single steps the processor. Also, terminates search to: last. Note: both search to switches (13) and (14) operate only if the arm (1) lamp is off (IF $\overline{\text{ARM}}$). |
| 14 | SEARCH TO: LAST TRANSFER (switch) | The last switch position is a momentary contact closure type with return to center which strobes the last executing address after the address in the match register. The transfer switch position is a momentary contact closure type with return to center which places the contents of the address display (21) into the match register. This switch also terminates a search to: last (14) selection. Note: Both search to: switches (13) and (14) operate only if the arm (1) lamp is off (IF $\overline{\text{ARM}}$). |
| 15 | RESET, LOW LOAD (switch) | The reset switch position is a momentary contact closure type with return to center which resets the instrument, turns off the arm (1) and match (2) lamps, clears the match or delay registers if they are selected, and terminates a search if one arm is in progress. A low load switch position is a momentary contact closure type with return to center which places the address switch register (10) contents into the least significant 8 bits of a selected register. |
| 16 | VARIABLE, 1–8 PRESET (switch) | This nine position selector switch selects delay in 1 through 8 processor micro-cycles; after which, the variable display (19) is loaded with whatever is on the processor data bus. |
| 17 | SEARCH (LED indicator lamp) | This indicator is on when a search to: first, any/s.s. (13), last transfer (14) is selected and the arm (1) lamp is off. |
| 18 | HALT (LED indicator lamp) | This indicator is on when the processor has been halted. |
| 19 | VARIABLE, 0–7 (LED indicator lamps) | This display is strobed at a time during the processor cycle determined by the variable, 1–8 preset (16) switch. |
| 20 | DATA, 0–7, (LED indicator lamps) | This display is an 8 bit fixed byte display which is strobed at a fixed time during the processor cycle. |
| 21 | ADDRESS, 0–15, (LED indicator lamps) | This strobes and displays the address in 16 bits. |

Architecture of the Analyzer

Figure 2:
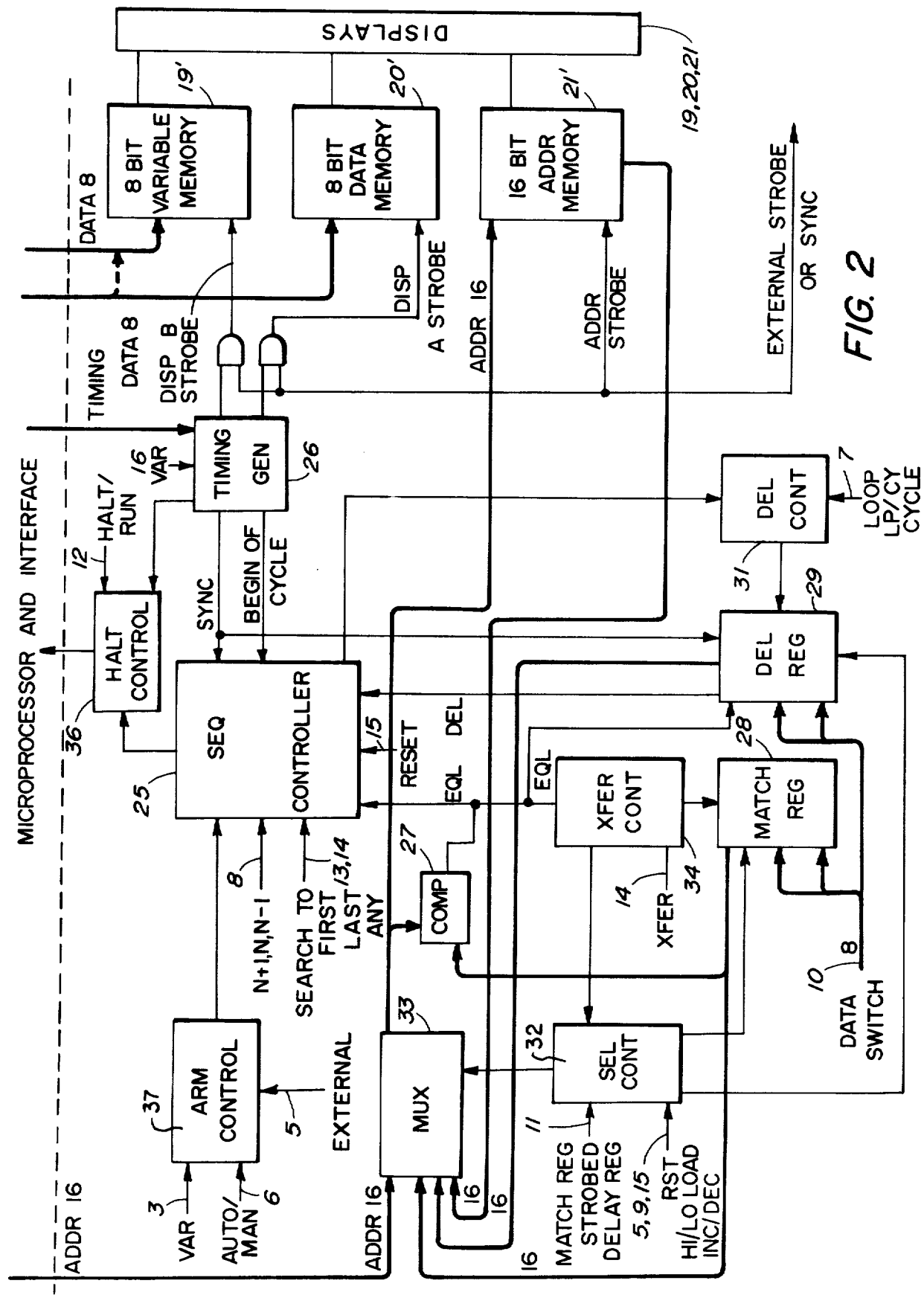
FIG. 2 is an overall block diagram of the invention.

The heart of the analyzer is an eight state sequential controller 25, shown in FIG. 2. Four states are indicated with the arm and match lights and are listed in the foregoing table. The full state diagram and the conditions of various transitions will be described below.

The sequential controller receives two timing signals from the timing generator 26. The "synch" signal is the main clock signal and specifies the time when the address and the data bus contents are in a steady state and valid. There is provision to delay the data strobe compared with address strobe. The "beginning of cycle" (BOC) signal is necessary to signify the start of an instruction cycle if so desired. Both of these timing signals are either directly available from the microprocessor, or they are derived from the processor's various clock and status signals by the analyzer timing generator. There are five uncommitted gates brought out on the rear connector of the analyzer to enable the interface module, one example shown in FIG. 2, to generate the needed signals for the generator. These interface modules are either prewired for specific processors or are universal and user jumperable.

The timing generator has one more function. In case the data bus is not 16 bits wide, both 8 bit data displays 19 and 20 are connected to the same 8 bit bus (see the dotted bus line) and, in this case, the timing generator, in connection with the address strobe, will time the display A and B strobes to display up to 8 machine cycles within the instruction cycles. The B strobe is the variable width reference to the A strobe. B has a 9th preset position also, which is defined by appropriate jumpering on the interface module. A B strobe can latch any other 8 bit information, such as control signals, status lines or contents of I/O ports. The address bus content is always strobed into the address display register at address strobe time, although the address lines could also be connected to match on control or data lines.

The sequential controller 25 has to be armed before any measurement is made. This can be automatic with a variable rate, or manual if one wants to study and latch one-shot phenomena. There is also a provision for external arming the sequential controller, which will allow the strobe of one analyzer to arm a second analyzer. Besides numerous manual control signals, such as N control 8 and reset 5, the sequential controller receives two more important internal signals. One is "Equal" (EQL), a signal sent by the compare unit 27 to signify a match between the address bus and the internally present match register 28; and the other is "Delayed" (DEL) a signal received from the delay register 29, meaning that a preset number of delay cycles has elapsed, or counted down to zero, after match. The delay register is connected to the delay control 31, which in turn receives switch closures 7 to specify loop delay, cycle delay or loop delay followed by cycle delay. Accordingly, the delay register counts either synch or equal cycles or combinations. Both the match and the delay registers can be preset to any 16 bit values in two 8 bit bytes via the 8 bit address switches 10 and the load switches 5, 15. They can also be incremented, decremented or reset. All this is under the control of the selection control logic 32, which is connected to the three position match register/strobed/delay register switch 11. In the first switch position, all the above described functions, such as loading, apply to the match register, and in the last switch position, to the delay register. In these two positions the controlled register is also displayed, via the (MUX) multiplexer 33, in the address memory and display 21, 21'. The strobed position is the normal operating position, and the address display 21 shows, also through Mux 33, the strobed address bus content.

Transfer is another operation through the MUX 33. It is frequently necessary to load the match register with the contents of the last strobed address display. On logic analyzers this requires the manual setting of 16 address switches. In the present application this transfer is a built-in function activated by the transfer switch 34. The implementation is somewhat unusual. To avoid another level of Mux, the transfer is accomplished by counting down the match register until the comparator tells the transfer control that the transfer is complete.

So far all operations of the analyzer are passive real time monitoring. However, there are interactive modes available. There is an uncommitted switch 5 marked "external". It can be used to reset, interrupt or tri-state the processor, or to simulate any other control line. Frequently it is used to change the gating of the timing bus, thereby permitting an easy change from machine cycle operation to instruction cycles or vice versa. The other more important interactive feature is hardware breakpoint capability. If the processor permits, halt can be executed at strobe time. After that, as already stated, manual or automatic, single or multiple stepping can be selected by simply selecting manual or variable rate auto arming and an appropriately delayed next breakpoint. All this is done with the halt control logic 36, which receives its signal from the sequential controller and the timing generator. The sequential controller also outputs a strobe signal for scope synchronization or strobe control purposes, or for arming another analyzer. But the strobe can also be used to reset or interrupt the processor, so that hardware looping can be achieved even around nonrepetitive program segments. Also by a small interrupt routine otherwise inaccessible data, such as contents of internal registers, can be examined at a breakpoint. This approach can imitate most of the features of software simulation.

Theory of Operation

Introduction

The microprocessor analyzer utilizes an eight state sequential controller circuit to implement its various operating modes. This section will describe in detail the synchronous controller circuitry and several other circuit subsystems contained in the analyzer as illustrated in FIG. 2. The subsystems consist of a halt control 36, a timing generator 26, an arm control 37, an eight bit variable display and data display with memory 19, 20, a sixteen bit address display with memory 21, a select control 32, a transfer control 34, a delay register 29, a comparator 27, a match register 28, a multiplexer 33, and a delay control 31. The detailed circuitry referred to is shown in FIGS. 3a–3d, 4a–4c, and 5a–5c. The following Table I gives the corresponding integrated circuit type designated to the circuits of the above figures:

TABLE I

| REF.NO. | TYPE IC | +5V | GND |
|---|---|---|---|
| U205 | SN74S112N | 14 | 7 |
| U206 | SN74S151N | 16 | 8 |
| U207 | SN74LS279N | 16 | 8 |
| U208 | SN74LS279N | 16 | 8 |
| U212 | SN74S112N | 14 | 7 |
| U215 | SN74LS193N | 16 | 8 |
| U216 | SN74S32N | 14 | 7 |
| U217 | SN74LS08N | 14 | 7 |
| U219 | SN74LS10N | 14 | 7 |
| U301 | SN74LS175N | 16 | 8 |
| U302 | SN74LS175N | 16 | 8 |
| U303 | SN74LS175N | 16 | 8 |
| U304 | SN74LS175N | 16 | 8 |
| U305 | SN74LS175N | 16 | 8 |
| U306 | SN74LS175N | 16 | 8 |
| U307 | SN74LS174N | 16 | 8 |
| U308 | SN74LS153N | 16 | 8 |
| U309 | SN74LS153N | 16 | 8 |
| U310 | SN74LS153N | 16 | 8 |
| U311 | SN74LS153N | 16 | 8 |
| U312 | SN74LS153N | 16 | 8 |
| U313 | SN74LS153N | 16 | 8 |
| U314 | SN74LS153N | 16 | 8 |
| U315 | SN74LS153N | 16 | 8 |
| U316 | SN74LS85N | 16 | 8 |
| U317 | SN74LS191N | 16 | 8 |
| U318 | SN74LS85N | 16 | 8 |
| U319 | SN74LS191N | 16 | 8 |
| U320 | SN84LS85N | 16 | 8 |
| U321 | SN74LS191N | 16 | 8 |
| U322 | SN74LS85N | 16 | 8 |
| U323 | SN74LS191N | 16 | 8 |
| U324 | SN74LS191N | 16 | 8 |
| U325 | SN74LS163N | 16 | 8 |
| U326 | SN74LS191N | 16 | 8 |
| U327 | SN74LS163N | 16 | 8 |
| U328 | SN74LS191N | 16 | 8 |
| U329 | SN74LS163N | 16 | 8 |
| U330 | SN74LS191N | 16 | 8 |
| U331 | SN74LS163N | 16 | 8 |

TABLE I-continued

| REF.NO. | TYPE IC | +5V | GND |
|---|---|---|---|
| U338 | SN74S153N | 16 | 8 |
| U350 | SN74LS123N | 16 | 8 |
| U351 | SN74S164N | 14 | 7 |

Halt Control

Figure 4A:
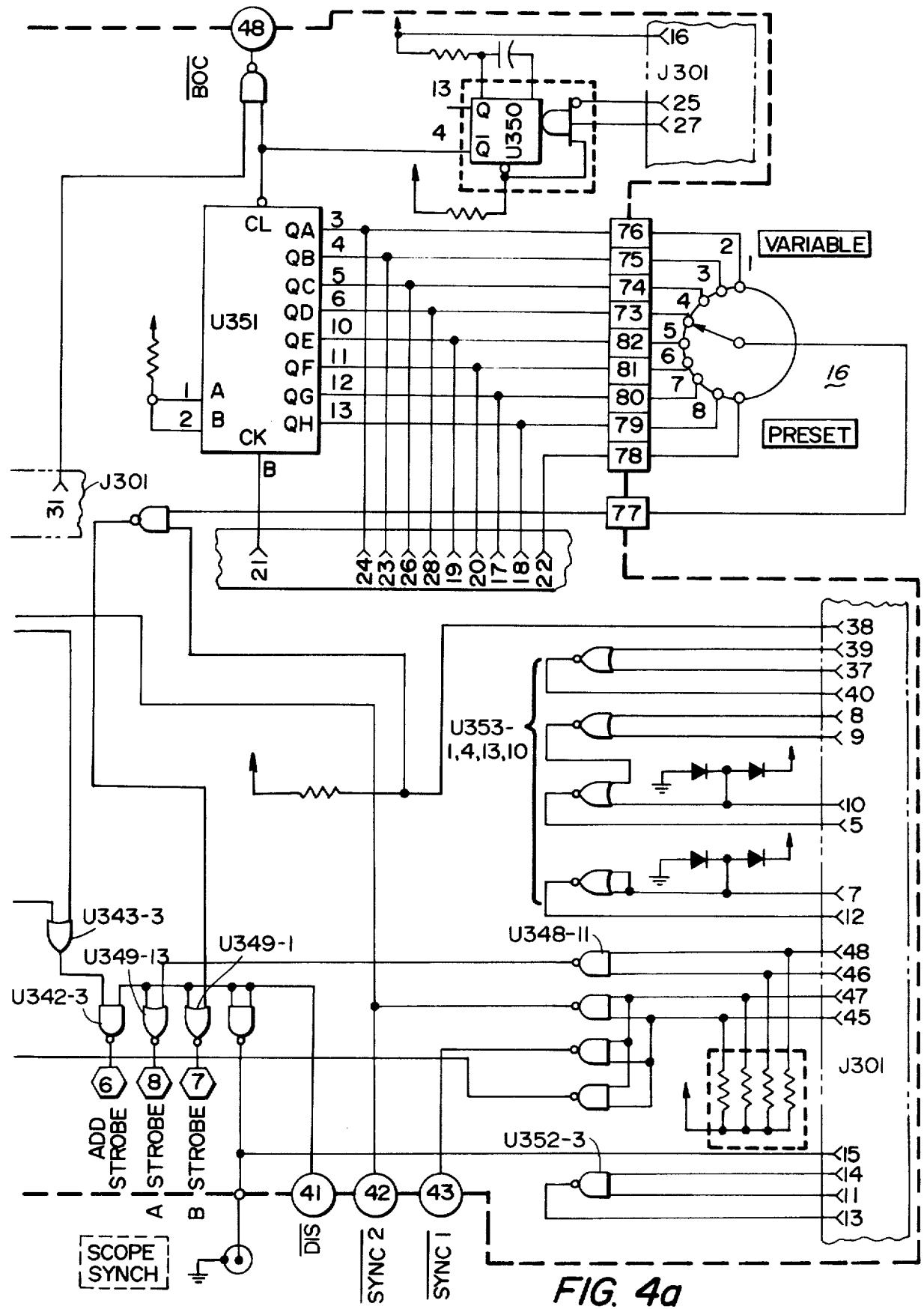
Figure 5A:
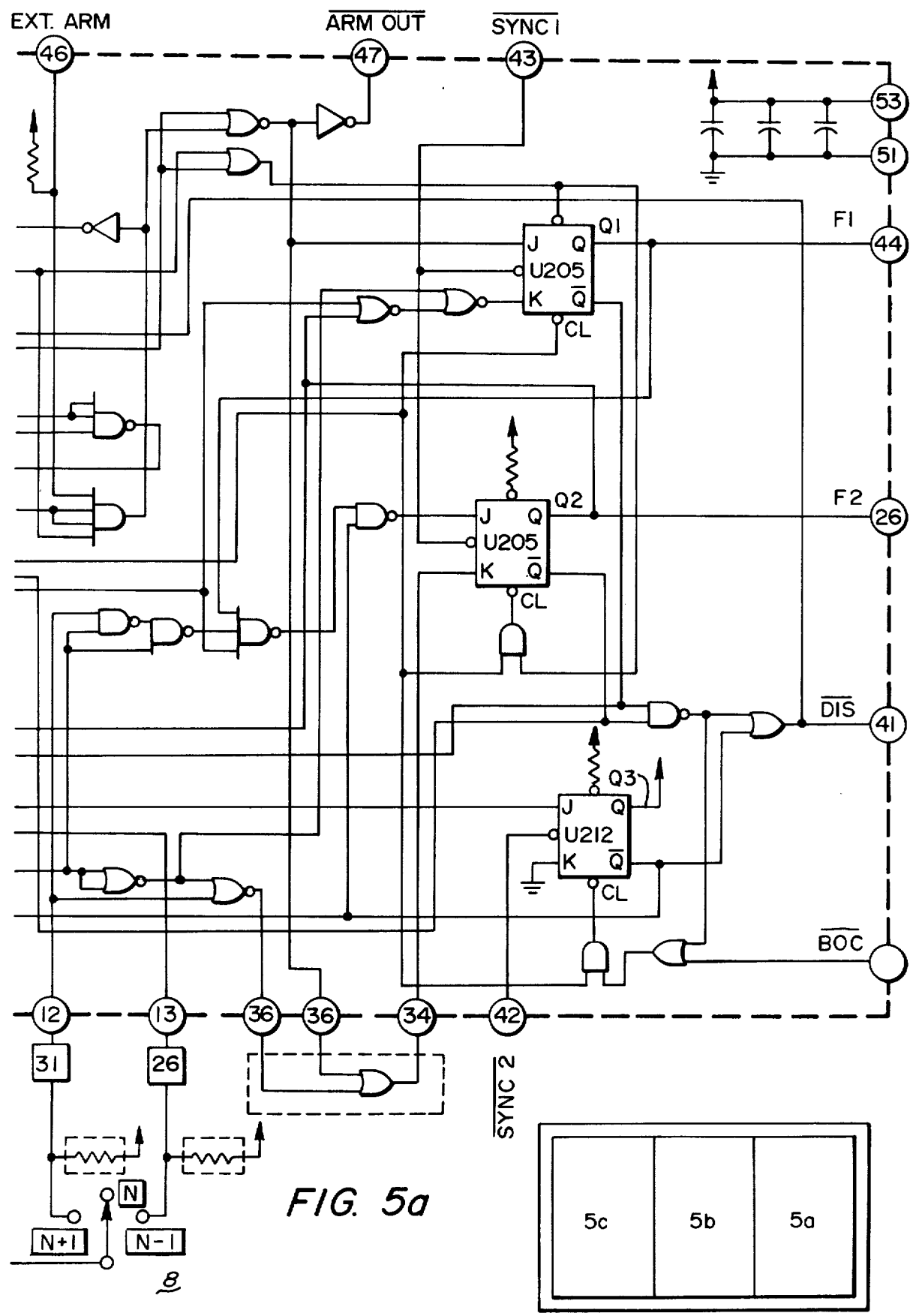
Figure 5B:
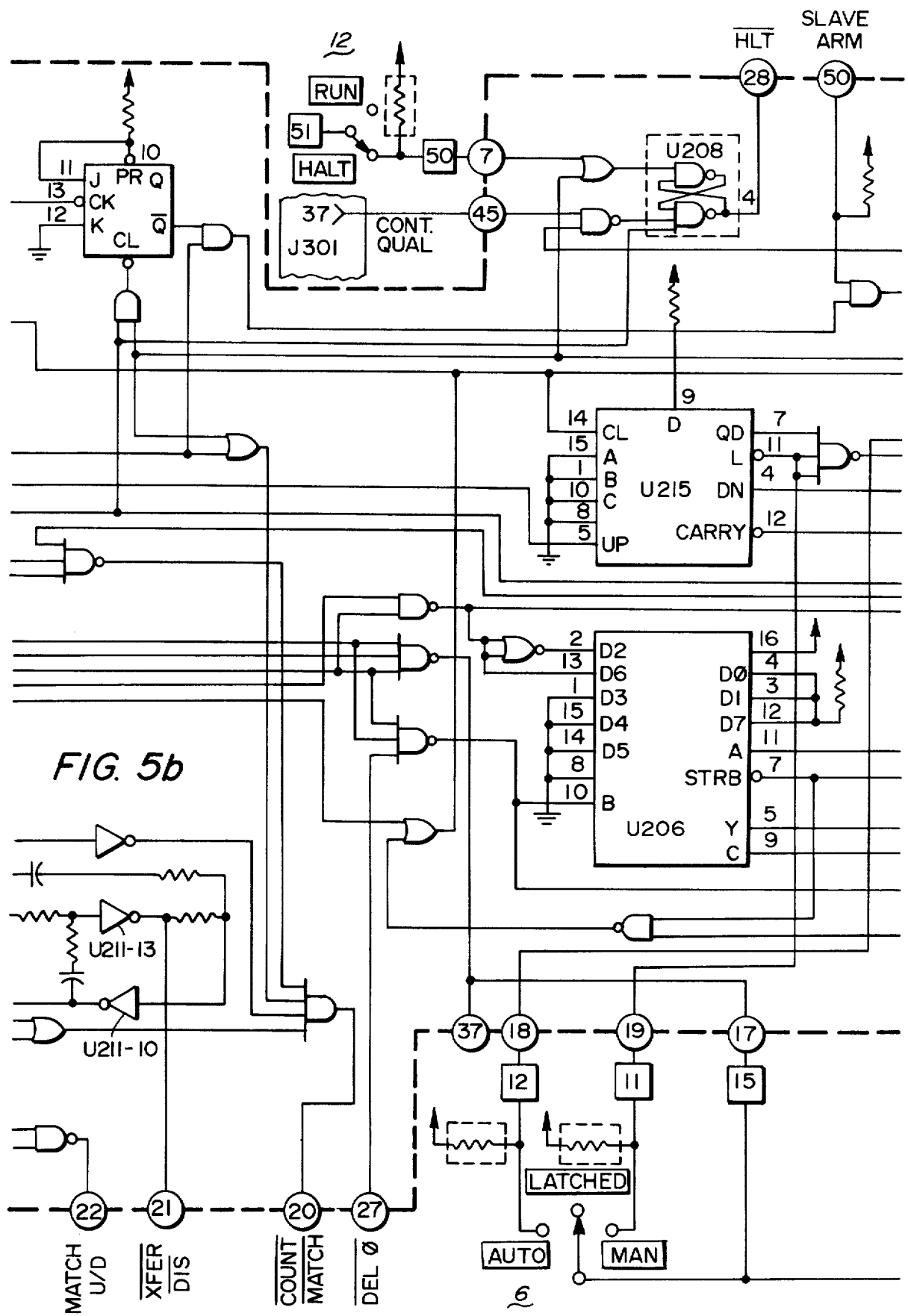
Figure 5C:
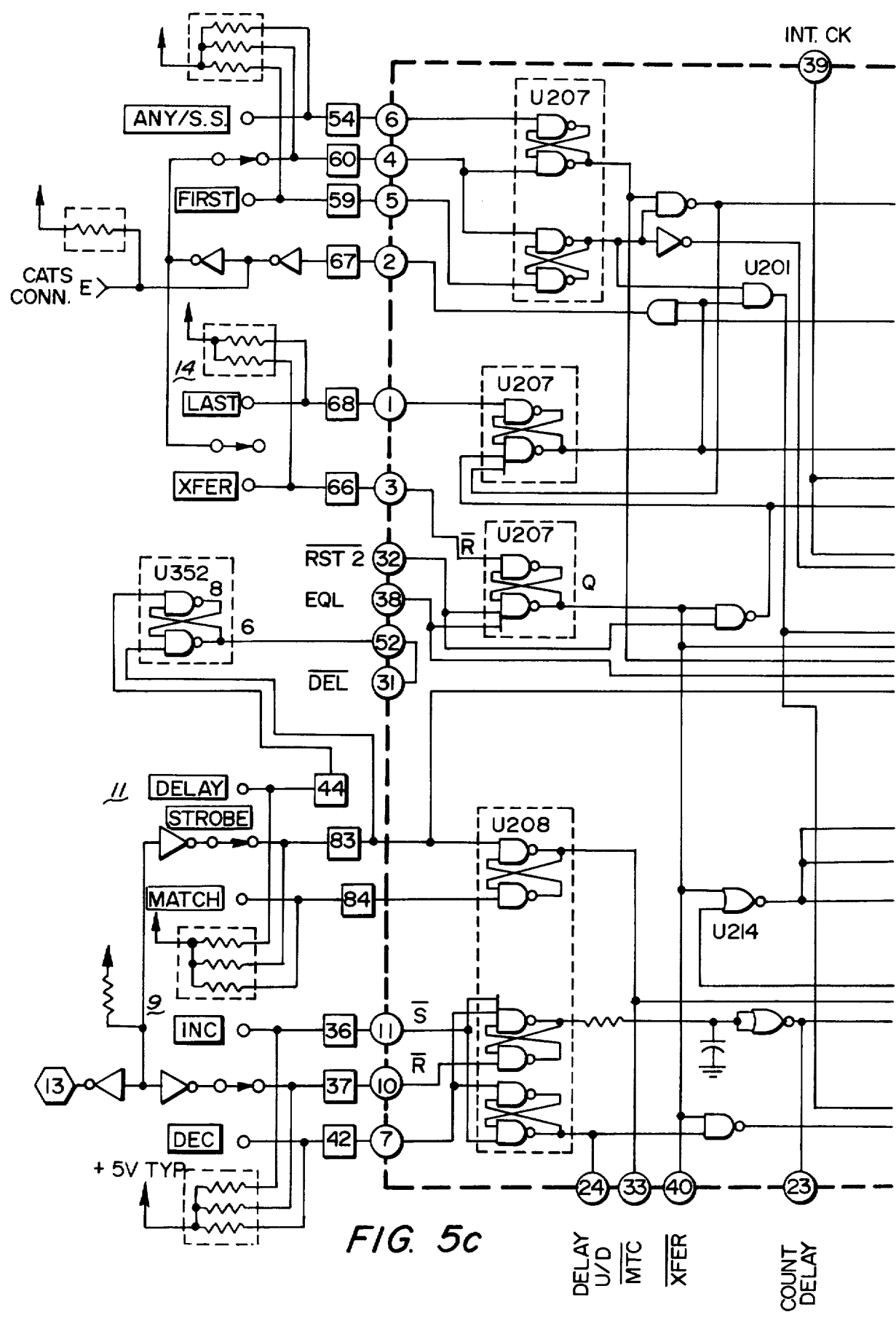

The $\overline{\text{Halt Qualifier}}$ line, pin J301-29 (FIG. 4b) is switched through an OR gate, with the run/halt switch 12 (FIG. 5b). This low is ORed with the $\overline{\text{Display}}$ input (FIG. 5a) from the sequential state logic. R-S flip-flop U208 (FIG. 5b) toggles in a hold state shutting out the $\overline{\text{Arm}}$ and continue qualifier or reset 2. The low out of flip-flop U208-4 is turning on the halt LED (FIG. 4b).

Timing Generator

This circuit interfaces the timing of the microprocessor under test with the analyzer internal sequencing. Four basic timing events or strobes are required by the analyzer. The events are:
1. The beginning or end of machine cycle or instruction cycle (BOC).
2. Time of the cycle when the address is valid. The address is compared with the match register content at sync time.
3. When the data A is valid. Data is strobed into the display marked Data on the front panel.
4. Time of the cycle when the data B is valid. Data B is strobed into the display marked variable on the front panel.

To aid in generating the above strobes the timing generator includes the following circuits:

To implement 1 above, the leading and trailing edges of the beginning of cycle (BOC) on pin J301-27 and J301-25 (FIG. 4a) are ANDed by one shot U350. The one shot output is NANDed with the BOC qualifier line J301-31 to produce the final $\overline{\text{BOC}}$ output.

To implement 2 to 4 above, an eight bit shift register, U351, (FIG. 4a) may be used to generate an eight phase signal based on the clock frequency of the microprocessor under test. The shift register is cleared at BOC time.

The strobe line inputs J301-48, 46 (FIG. 4a) are NANDED by U-348-11 and NORed by U349-13 with the $\overline{\text{Display}}$ state ($\overline{\text{D15}}$) input to produce the A strobe signal.

The B strobe line J301-38 is NANDed by U348-8 with the selected state from the variable switch 16 and NORed by U349-1 with the $\overline{\text{Display}}$ state input to produce the B strobe signal.

Additional circuitry includes five uncommitted gates U353-1, 4, 13, 10 and U352-3 for conditioning processor signals prior to implementing the four timing fucntions. The external position on the external/high load switch 5 (FIG. 3a) puts a ground on the $\overline{\text{Ext}}$ line J301-33 to select different operating modes, i.e., machine cycles v. instruction cycles or control or external functions from the analyzer front panel. This switch may also reset or interrupt the microprocessor.

Arm Control

Arm control circuit is made up of two major components, the variable timer and an arm generator. The variable timer is constructed of 1/2 U350 (FIG. 4b) dual retriggerable monostate multivibrator. The $\overline{\text{Q}}$ output pin U350 is inverted and fed back to the input via sync gate U349-4. This makes the multivibrator free run. The frequency is variable with the front panel rate potentiometer, 3. U344-3 is a power turn on reset pulse. The frequency output is NAND gated by U341-11 and distributed as internal clock. This internal clock signal is also used as the search-to-first timer and to strobe the display in match register or delay register positions. The second section consists of an arm generator centered around counter U215 (FIG. 5b). In the auto arm mode the count down input is held high enabling the counter to count and generate an $\overline{\text{Arm}}$ signal with its carry. When the sequential controller is armed, it raises the lockout line; holding the counter cleared until it gets to the finish state, where the timer can start to count to rearm the controller. The time waited before rearming is 16 times the period of the variable timer: for example, 100 ms-1.6 Sec. In the manual arm mode, when the switch is activated the counter is loaded with 1000. When the switch is released the counter counts to 1111, generates $\overline{\text{Arm}}$ with its carry and is cleared with lock out as before.

Variable, Data and Address Displays

Figure 3A:
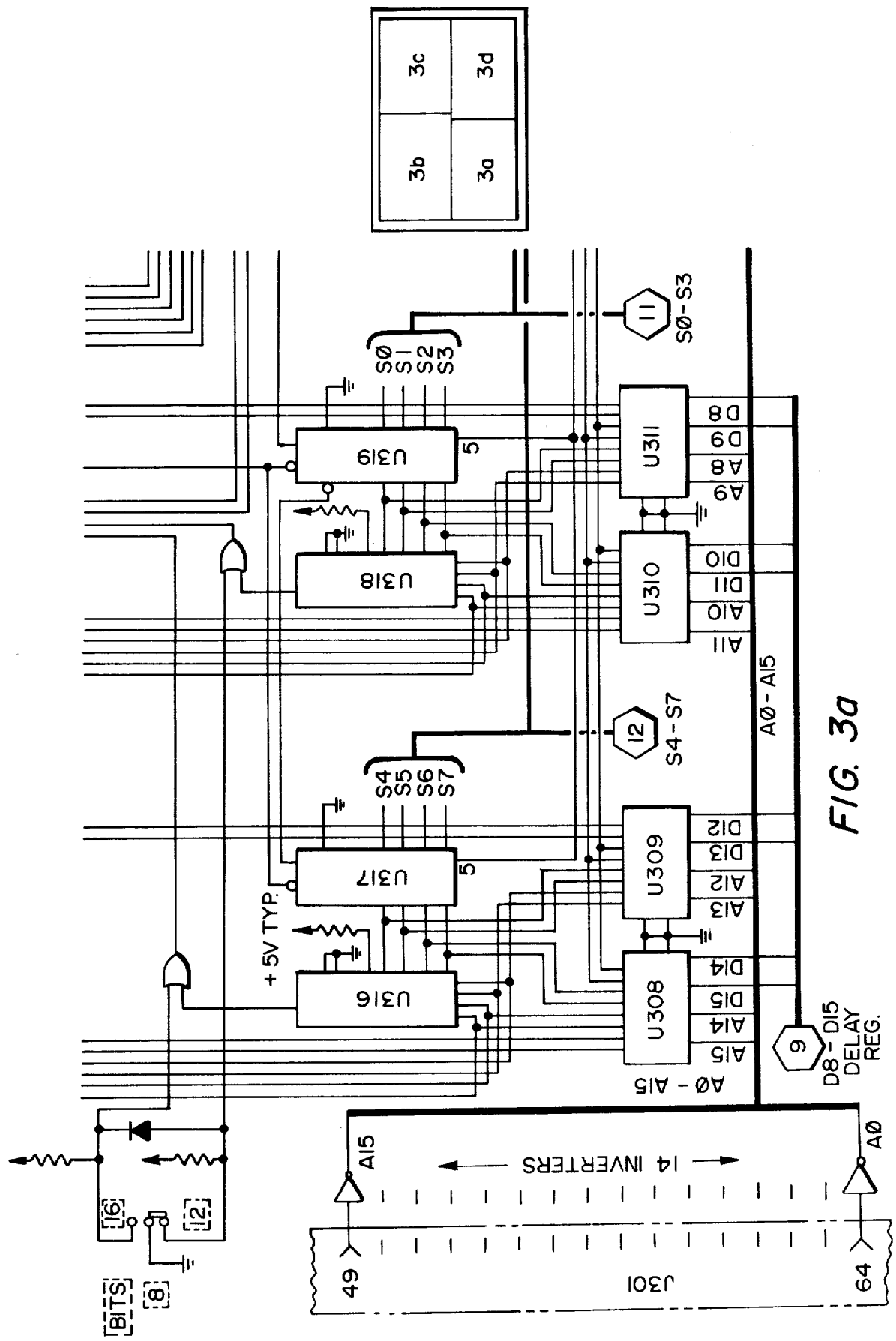
Figure 3B:
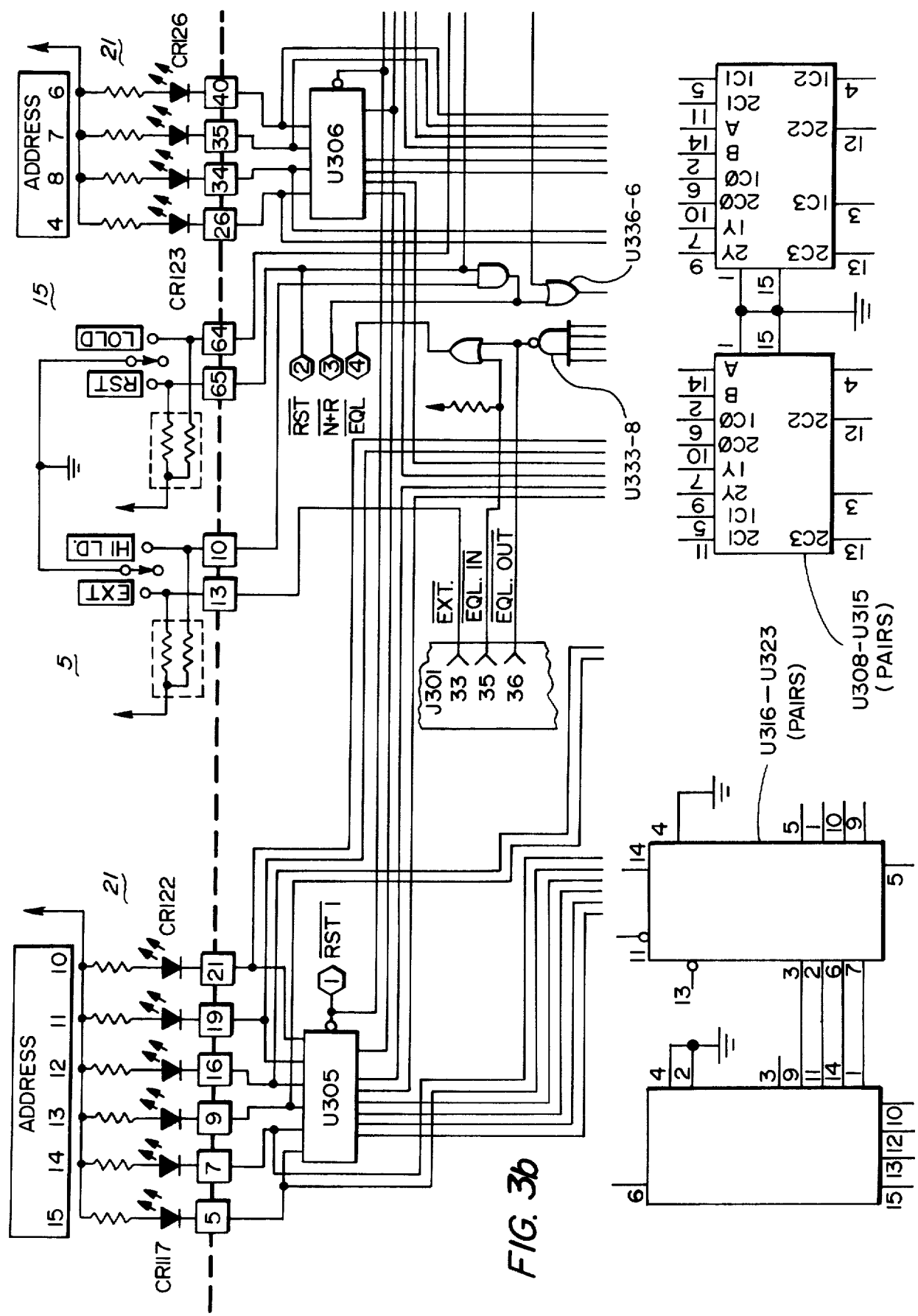
Figure 3C:
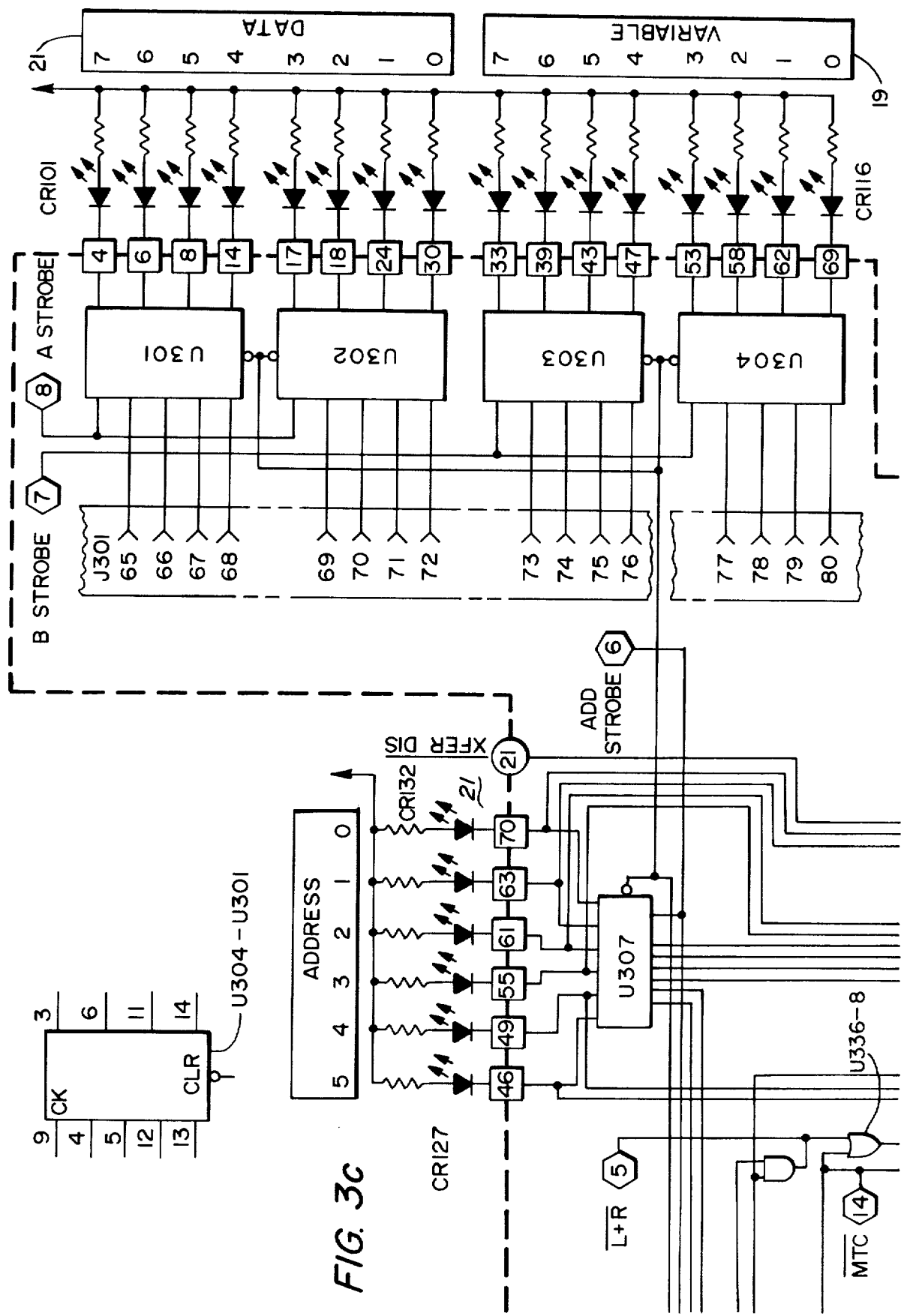

There are two eight bit data displays called variable and data (FIG. 3c). All sixteen LED indicators CR101-116 are binary weighted and are driven by four quadruple D-type flip-flops U301-304. When power is turned on each of the flip-flops is cleared by the auto reset contained in the arm control circuitry. The two eight bit displays may be strobed for a 16 bit parallel display or strobed separately. The data displays U301, 2 receive their clock signal from the A strobe originating in the timing generator circuitry. the variable display flip-flops U303,4 receive their clock signal from the B strobe originating also in the timing generator circuitry. This permits the display of an 8 bit data bus input at two different times. The inputs to the flip-flops come directly from the rear pin J301 connector which is connected directly to the microprocessor bi-directional eight bit data bus. The output of the flip-flops is taken from the $\overline{\text{Q}}$ pin so as to present a low or current sink for the LEDs.

There is one sixteen bit address display labeled address (FIGS. 3b,c). This display contains sixteen LEDs CR117-132 that are binary weighted and driven by two hex D-type flip-flops and one quadruple D-type flip-flop U305, 307, and 306, respectively. These flip-flops are also cleared when power is turned on by the same circuit resetting the variable and data display. The address display is clocked, however, with the display signal from the sequential controller circuitry when strobe mode is selected and by the internal clock when the match or delay mode is selected. The inputs to the address flip-flops come directly from the outputs of the multiplexer circuitry which receives the inverted address data directly from the microprocessor address line. The Q outputs are used by the address flip-flops to turn on the address display LEDs.

Select Control

The main function of this circuitry is to select the correct multiplexer input to be presented to the comparator and the sixteen bit address display circuitry. This circuit 32 also enables the reset, hi load, lo load increment and decrement switches and routes them to the correct register.

Figure 3D:
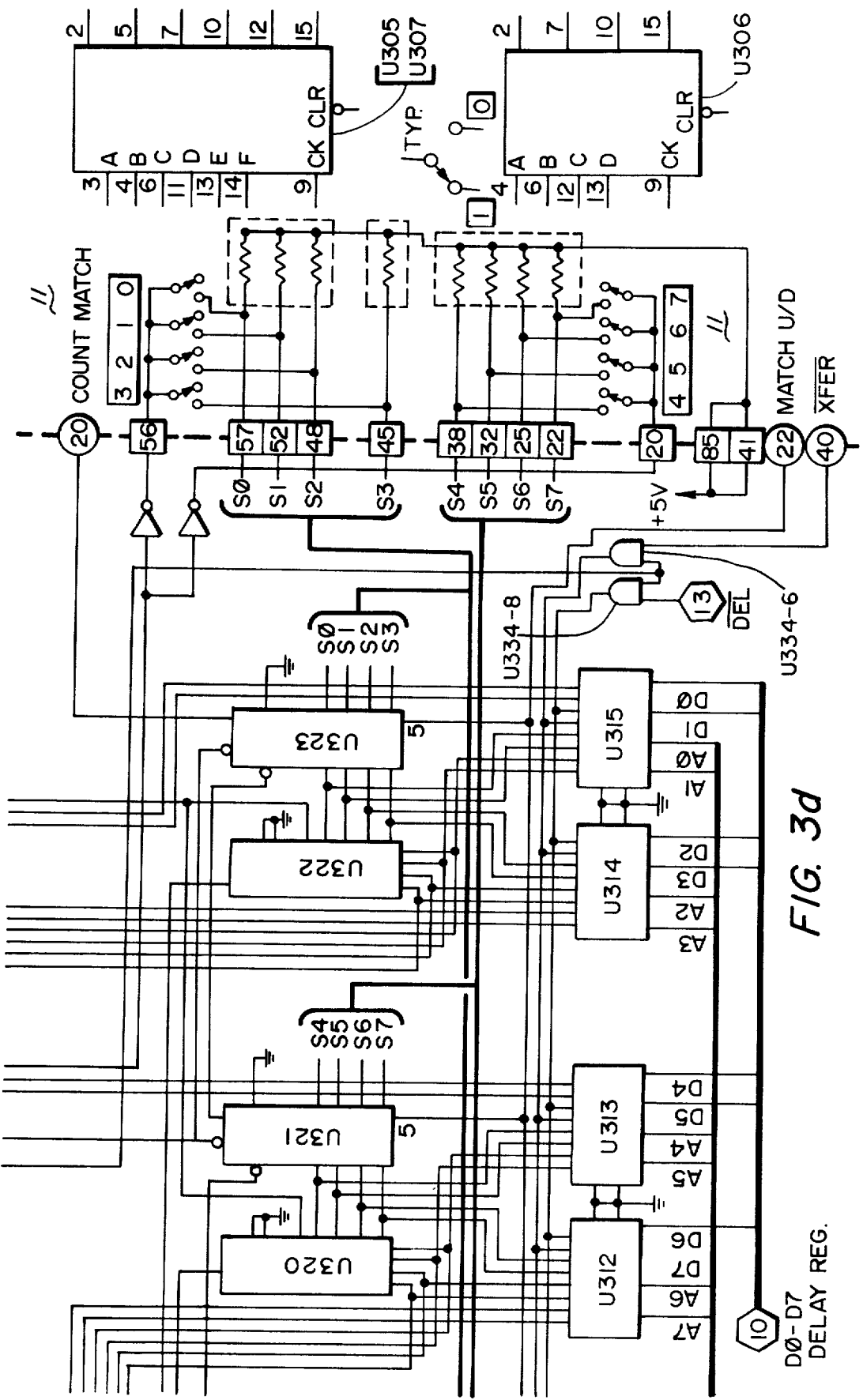

With the address switch 11 (FIG. 5c) in the match position R-S flipflop U208 Q output (MTC) is set low activating the match ($\overline{\text{MTC}}$) register (FIG. 3a) and inhibiting $\overline{\text{XFER}}$ U334-8 and $\overline{\text{DEL}}$ U334-6 (FIG. 3d). This low ($\overline{\text{MTC}}$) enables the hi load, lo load, address and reset switches (5, 15) with gate U336, 8 (FIGS. 3b, c). Likewise the low ($\overline{\text{MTC}}$) gates on the clock from the arm control circuit with U344-6 (FIG. 4b) and U343-3, (FIG. 4a) thereby generating the address strobe via U342-3. Thus, the match register is displayed and this register may be incremented, decremented, reset and both high and low order byte loaded.

Similarly with the address switch 11 (FIG. 5c) in the delay position, R-S flip-flop U352-6, 8 Q output is set low activating the delay ($\overline{\text{DEL}}$) line. The low on ($\overline{\text{DEL}}$) enables the hi load, lo load, address and reset switches with gates U336-3, 11 (FIG. 4c). Likewise the low ($\overline{\text{DEL}}$) gates on the clock from the arm control circuit with U344-6 (FIG. 4b) and U343-3 (FIG. 4a) which in turn, generates the address strobe via U342-3. Thus the delay register U324-U330 (FIG. 4c) is displayed and this register may be incremented, decremented, reset, and loaded with both high and low order bytes. In the strobed position both R-S flip-flops U352-8,6 and U208-7 (FIG. 5c) Q outputs are high, shutting off the arm control clock U343-3 (FIG. 4a) to the address srobe line U342-3 (FIG. 4a). Thus the address from the microprocessor is multiplexed to the comparator circuits and the address display to be strobed by the sequential controller. In this position the increment-decrement switch is enabled to the delay register by the high on the ($\overline{\text{MTC}}$) line which is inverted by U337 and grounds the U330-4 (FIG. 4c) enable line of the first delay register counter.

During transfer selection the output of the address display is selected on the multiplexer circuits and presented to the comparator circuits.

Transfer Control

The circuit 34 is used to transfer an address on the A0-A15 lines to the match register. To accomplish this, closure of the transfer switch grounds the $\overline{\text{R}}$ input to R-S flip-flop U207 (FIG. 5c) so that the Q output is low. This low is fed to the B input select of the multiplexers U308 through U315 (FIG. 3a,d) via ($\overline{\text{MTC}}$) select gate U334-8. The low out of the R-S flip-flop also enables, through control gate U214 (FIG. 5a), the transfer oscillator (FIG. 5b) of U211-13, 10 and associated capacitors and resistors. The oscillator output inhibits the two low byte comparators U320, 322 (FIG. 3d) and provides down count signal to the match counters U317, 19, 21, 23 (FIGS. 3a, d). The comparators compare the down count with the address. Once match has occurred, an $\overline{\text{EQL}}$ signal from the comparator resets the R-S flip-flop U207 to a high output and transfer is terminated.

Delay Register

The delay register (FIG. 4c) consists of two sixteen bit counters. One of the counters consists of four synchronous up/down counters U324, 326, 328 and 330. These are coupled to the address display via the multiplexer U308-315 (FIGS. 3a, d) and are displayed when delay reg. (FIG. 4c) is selected. U337-12 is an inverter which inhibits the enable line of U330 when ($\overline{\text{MTC}}$) is low; i.e., when the match reg. is selected. Otherwise the enable line of U330 is low permitting the delay register to count. This register is also loaded, reset, incremented and decremented.

The second sixteen bit counter consists of four synchronous four bit counters U325, 327, 329 and 331 (FIG. 4c). These counters are loaded from the U324, 326, 328 and 330 counters and are counted down by every sync cycle controlled by the delay control circuits. The ripple carry output from these counters is coupled to gate the $\overline{\text{DEL}}$ signal to the sequential control circuitry.

Incrementing and decrementing the delay register is performed by the increment/decrement switch 9 (FIG. 5c) only. This switch effects the match register similarly when match is selected; however, the delay register may be incremented or decremented in both the strobed and the delay reg. switch positions. INC/DEC switch 9 in the INC or momentary position grounds the $\overline{\text{S}}$ input of R-S flip-flop U208 with $\overline{\text{R}}$ high and thus the Q output is high. This makes both the delay U/D and match U/D (FIG. 5b) lines high. This increments the delay register one count since continuous counting is inhibited by the count delay line to U330-14 (FIG. 4c). Similarly the dec position will set R-S flip-flop Q output low and thus enable a down count with the count delay line allowing only one count to be stored in the selected register. The center position removes count delay.

Comparator

The comparator 27 circuit (FIGS. 3a, d) consists of four four-bit magnitude comparators U316, 318, 320, 322 which compare the output of the match registers U317, 319, 321 and 323 with the output of the multiplexer circuits U308-315 and generate an equal signal ($\overline{\text{EQU}}$) when they match. The bits switch allows a "dont't care" condition at the MSB 4 or 8 bits by forcing the comparator inputs to the summing gate U333-8. This allows 8, 12 or 16 bit compares.

Greater than 16 bit compares may be made by daisy chaining the $\overline{\text{EQLOUT}}$ output J301-36 from one analyzer to the $\overline{\text{EQLIN}}$ input J301-35 of the next analyzer.

The $\overline{\text{XFER DIS}}$ signal (FIG. 3c) on pin 3 of U320 and 332 (FIG. 3d) helps to gate out possible noise spikes on the comparator outputs while the match register is rippling during transfer.

Match Register

The match register (FIGS. 3a, d) consists of four synchronous up/down counters U317, 319, 321, 323. The counters may be asynchronously preset, reset, incremented, decremented and displayed when the match reg. position is selected. In addition, the register is forced to count up when search to first or last is selected since the match U/D line pin 5 of U317, 319, 321, 323 is driven low by the gate U201 (FIG. 5c) high in the sequential control circuits. However, if transfer is selected, the transfer and control circuitry drives the match U/D line high and forces the match register to count down until match occurs.

Multiplexer

The multiplexer 33 circuit (FIG. 3a, d) consists of eight dual four-line to one-line data selectors/multiplexers U308-315. These multiplexers receive the A and B select inputs, pins 14 and 2, from the select control circuits. The combination of $\overline{\text{DEL}}$, $\overline{\text{MTC}}$ and $\overline{\text{XFER}}$ lines effects the A and B levels and selects either the address lines, the output of the match register, delay register or address display to be gated to the input of the comparator circuits and address display.

Delay Control

The delay control (FIG. 4b) consists of several input and output gates driving a dual four-line to one-line data selector/multiplexer U338. This circuit controls the loading and counting sequence of the delay register in four modes by switching the P and T enable lines of U331, 329, 327, 325 delay counters FIG. 4c. The four modes are cycle delay, loop delay, LP/CY with cycle=0, and LP/CY with cycle≠0.

The delay register always makes its initial count with (arm.eql.sync) which is the match condition, so that it is always one count ahead of the sync pulse that will clock the sequential controller into the display or strobe state.

In the cycle delay and loop delay mode the delay reg is treated as one 16 bit counter and clocked every sync or (sync.eql) respectively after match.

In the Lp/Cy modes the delay reg is treated as two separate 8 bit counters with the LSB containing the cycle count and the MSB containing the loop count.

With cycle≠0, the cycle register receives the initial count (arm.eql.sync). Then the loop register is counting (match.eql.sync) until it generates a carry, then it is disabled, the cycle register is re-enabled and counting until it carries. This generates del meaning the delay has timed out. With cycle=0 the loop reg is counting as in the loop mode. In both modes del is not generated until (C2.C4.eql) or the next match after the register is counted to zero.

The relevant logic equations implemented by the delay counter block diagram are as follows:

T1 = F1
T3 = C2 + [F2.(LP/CY)]

P1 = P2 = LP.EQL + CY.(F2 + EQL) + (LP/CY).-
$\overline{ZERO}$.[(F2.C4) + (F1.$\overline{F2}$.EQL)]

P3 = P4 = LP.EQL + CY.(F2 + EQL) + [(LP/CY)-
.EQL.$\overline{C4}$]
LD = F1.$\overline{F2}$.$\overline{EQL}$ + F1 + F3

The four modes at the Mux inputs are coded as follows:

|  | B | A |
|---|---|---|
| CY | 1 | 0 |
| LP | 1 | 1 |
| LP/CY | 0 | 1 |
| LP/CY . $\overline{ZERO}$ | 0 | 0 |

LP/CY means loops followed by cycles, LD means load.

State Diagram of the Sequential Controller

FIG. 6 shows the eight states and all possible transitions of the sequential controller. The 8 states are implemented by 3 flip-flops, (U212, U205, a dual device) with Q1, Q2 and Q3 outputs. Q1 and Q2 drive the arm and match LEDs shown in FIG. 1. As can be seen, every transition is synchronized either by Synch or BOC. Reset is the starting point, and ARM.SYNCH leads to the Arm state. Most typically, with strobe at N, the next state is either Strobe III at match time if delay is set to zero, or match state is followed by Strobe III after the delay times out. All other states are made necessary because of N+1 and N−1 strobe conditions; that is if the analyzer is required to strobe one cycle ahead or behind the set delay. N+1 requires an extra cycle of Wait state, the condition (N+1).DEL.EQU.SYNCH and (N+1).DEL.SYNCH cause the transition from Arm and Match to Wait respectively. The next Synch generates Strobe III.

Most complex is the N−1 strobe. Since there is no built-in memory, the N−1 state can be displayed only if the display registers are strobed at every Synch in anticipation that the next cycle might be N. From Arm every (N−1).EQU.SYNCH leads to Strobe I, and BOC returns it to Arm. If EQU is reached and delay is set to zero, the next state is Finish, and the previous Strobe I display remains. If delay is not equal to 0, Strobe II is reached from Arm via N-−1.EQU. DEL. At this time, the Strobe II and Match states alternate until the end of the delay where (N−1).DEL.SYNCH points to Finish again. Strobe III is also turned into Finish by BOC.

It would be evident to those skilled in the state of the art that with additional memory more states, for example 256 states, could be captured and later displayed both before or after N. A counter could be sequenced by the Sync pulses to load consecutive address and data bits into a RAM register. The loading would be stopped at strobe time in the "before N" mode and started in the "after N" mode. This technique is not new, it is used in logic analyzers.

The three search and the transfer modes are also controlled by the same three flip-flops as the 8 states just discussed. In the search modes fewer states are needed through, since N and Delay=0 are forced regardless of the switch and delay register settings. N−1, N+1 or Delay≠0 would give false and misleading search displays.

The search to any is accomplished by forcing an EQL with an immediate strobe and display. The search to last checks for EQL, meaning that the instruction is executed, then increments the match register and checks again. Obviously this process will stop at the first branch instruction, that is at the least consecutively executed instruction. This search is as fast as the execution of the instructions.

Search to last leaves the search light on and has to be terminated, for example, by transfer search to first or reset before normal arming can resume. Similarly arm has to be terminated before any search. The restriction is rather logical: both arm and search lights indicate a measurement in progress. Since they are different processes, one of them has to be terminated before the other starts.

The search to first is different. Here the analyzer increments the match register if there is no execution. But since there is no general way to tell how long one should wait before concluding that there will be no match, the operator has to make an estimation and set the arming rate control for search rate timing. This is the same control but 16 times faster, than the variable arming rate. If the setting is in error, the worst that can happen is that the search is slower than necessary on one hand, or it is too fast and misses the first one or two instructions of the next executed program segment. This can be easily checked by manually backstepping and verifying.

There are two types of Arm. Synchronous which requires (Arm.Sync) to enter the Arm state, which is used with the auto, manual and external arm, and asynchronous which presets the F1 and clears the F2 flip-flop. This is used with slave arm and in the search modes.

The search modes use the same logic with two exceptions. They all force the N mode and force delay=0 true regardless of the mode or content of the delay register.

The fourth flip-flop in the sequential controller is the search to any/first flip-flop. Its function is to permit only one search to occur.

Search to Any also qualifies (EQL) regardless of the contents of the match register. By using the same logic and equations, the state machine displays with the next Sync. If the processor is halted, a search to any will cause it to come out of halt for one cycle, display it, then halt the processor again to achieve single step. Search to First initially arms the sequential logic. While armed, internal clock will increment the match register until a match is found. At this time the state machine proceeds to the Display or Strobe state, terminating Search to First, then on to the Finish state.

Search to last is latched in an R/S latch, arming the sequential logic. When a match is found (EQL) the state machine follows its normal path through Strobe to Finish.

Once in the finish state, the match register is incremented and the sequential logic is rearmed to see if the next location is executed.

The sequential controller implements the following logic equations:

$$F1J = ARM.(\overline{F1+F3})F1CL = RST$$

$$F1K = DEL.(F2+EQL)$$

$$F1PR = (ANY+LAST).(\overline{F1+F3})$$

$$F2J = F1.EQL.[(\overline{N+1})+\overline{DEL}]+F3+SLAVE\ ARM$$

$$F2K = ARM.(\overline{F1+F3})+(N+1).DEL$$

$$F2CL = [(LAST+ANY).(\overline{F1+F3})]+RST+SLAVE\ ARM$$

$$F3J = F1.\{F2.[(N-1)\oplus DEL]+\overline{F2}.[(\overline{N-1}).DEL.EQL+(N-1).(\overline{EQL+DEL})]\}$$

$$F3k = 0$$
$$F3CL = BOC.(F1+F2)+RST$$

$$DISPL = F3.(F1+F2)$$

Application Example

It is quite different to give an adequate picture of the extensive application possibilities of the analyzer of the present invention. It is somewhat like playing chess: the rules are simple, but the possible strategies are almost limitless.

As an example of the present invention a short program written for the MOS Technology Inc., Norristown, Pennsylvania 19401 (trademark) Model #6502 Microprocessor is illustrated. The program and its associated data are illustrated in several different formats which are somewhat equivalent to each other. These consist of the program example of Table II, the data sequence of Table III and the flow chart of FIG. 7. All of the numbers illustrated are in hexidecimal code.

TABLE II

HEXADECIMAL CODE

| Address | First Byte | 2nd & 3rd Bytes if required | MNEMONIC CODE | |
|---------|------------|----------------------------|---------------|---|
| FFE0 | A0 | 00 | LDY | |
| FFE2 | A2 | 00 | LDX | |
| FFE4 | 98 | (9D) | TYA | |
| FFE5 | 9D | 00 01 | STA | TABLE, X |
| FFE8 | C8 | (F0) | INY | |
| FFE9 | F0 | F5 | BEQ | |
| FFEB | E8 | (E0) | INX | |
| FFEC | E0 | 10 | CPX | |
| FFEE | D0 | F4 | BNE | |
| FFF0 | F0 | F0 | BEQ | |

TABLE III

| ADDRESS | 1 DATA | 2 DATA | 16 DATA | 17 DATA |
|---------|--------|--------|---------|---------|
| 0100 | 00 | 10 | F0 | 00 |
| 0101 | 01 | 11 | F1 | |
| 0102 | 02 | 12 | F2 | |
| 0103 | 03 | 13 | F3 | |
| 0104 | 04 | 14 | F4 | |
| 0105 | 05 | 15 | F5 | |
| 0106 | 06 | 16 | F6 | |
| 0107 | 07 | 17 | F7 | |
| 0108 | 08 | 18 | F8 | |
| 0109 | 09 | 19 | F9 | |
| 010A | 0A | 1A | FA | |
| 010B | 0B | 1B | FB | |
| 010C | 0C | 1C | FC | |
| 010D | 0D | 1D | FD | |
| 010E | 0E | 1E | FE | |
| 010F | 0F | 1F | FF | 0F |

Referring to Table II and the program example, the higher instruction addresses begin at FFE0, the first instruction, and continue consecutively to FFF0, the last. There are three nested loops in the program. In the first line of the program AO is an operational code which has a standard definition as illustrated by the mnemonic code, LDY, load register Y with the contents of the next byte of the associated memory which is 00 in this case. The flow chart of FIG. 7 illustrates this step also in the second block.

Figure 7:
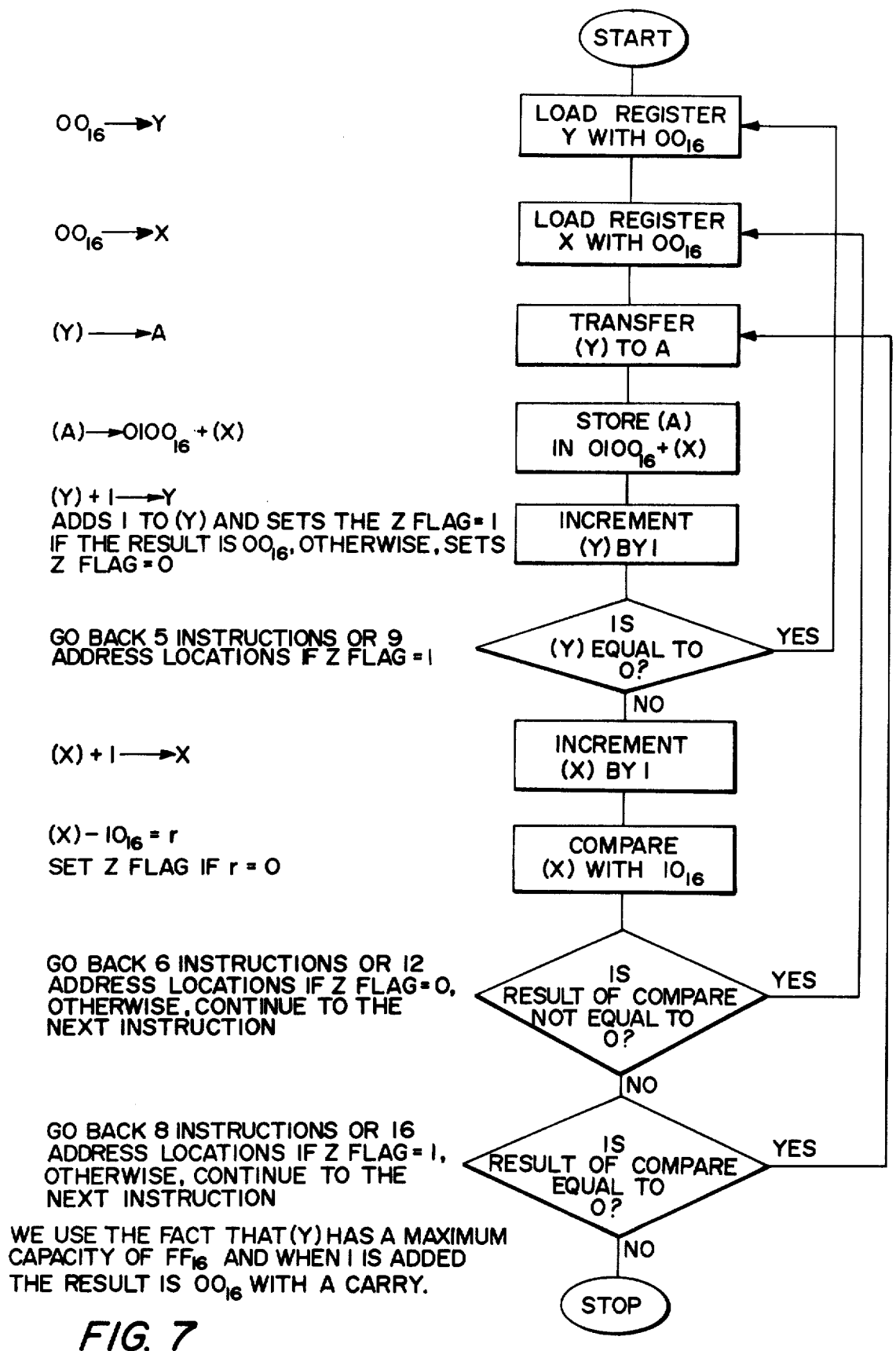
FIG. 7 is a flow chart illustrating the program of Table II.
Figure 8:
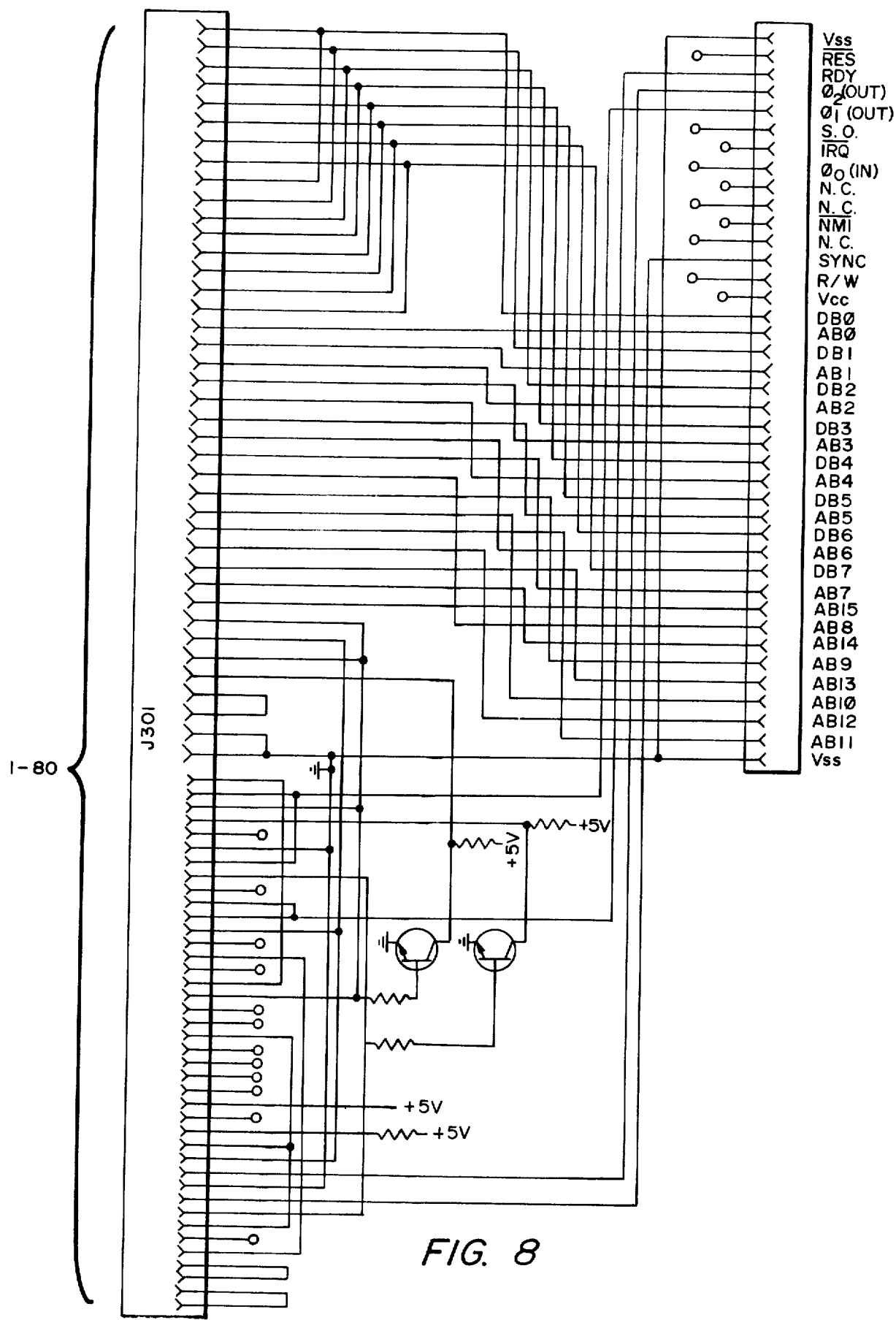
FIG. 8 is a typical interface diagram for connecting a microprocessor to be tested to the analyzer of the present invention.

In the second step of the program A2 at FFE2 has the associated mnemonic LDX, where as stated by the flow chart of FIG. 7, the register X is loaded with the second byte of the instruction which in the initial case is 00. In the third step FFE4, the contents of the Y register are transferred to the accumulator, i.e., TYA and in FFE5 the accumulator contents are stored at the address 0100 offset if any by the contents of the X register. The base address is given by the second and third bytes of the instructions. And this address is the first address shown in the Table III with its data, which is 00 at the first time. In the next step, FFE8, the Y register is incremented (INY). Then as best illustrated by the flow chart of FIG. 7, in the step FFE9 a decision is made as to whether the contents of the Y register are equal to 0. This is the first or inner loop of the three nested loops of this program. In this case it is not zero so the program is continued rather than looping back.

The overall program is best illustrated by the Data Sequence Table III along with the program example, of course, and has two nested inner loops as well as a branch to the beginning from the innermost loop. The program stores in 16 locations of memory, 0100 through 010F, as data, a successive string of numbers from 00 to FF. Thus, 16 will be added at each stored location, 16 times, before the program begins again as illustrated in the 17th data column. At any of the storage addresses, the high byte of the data will be counting up from 0 to F.

The foregoing program can be traced by the analyzer of the present invention without ever manually entering an address or delay through the data switches. Specifically analyzing the program and assuming that it is incorrectly or inadequately documented (which is a difficult but real problem) the first task is to find out what the program is and where it is stored. The switches referred to in the examples are best shown in the front panel drawing of FIG. 1. Activating the Search to Any routine will located at random any executed address. For example, address FFEB. This is an address in a running program. Seach to any does not automatically load the match register; that is, register 21. However, by utilizing the transfer switch 14 FFEB can now be transferred to the match register and the increment switch 9 used to trace the program from this point. All of the consecutive addresses can be found in this manner. Also the last address, FFF2, of the segment can be found by Search to Last switch 14.

Assuming however that the full address field is desired to be searched in machine code the match register can be reset to 0000 and a Search to First conducted which will yield 0100 of the first lower addresses. If 0100 is found, Search to Last will yield 010F. Since this address will automatically be stored in the match register a search to first can again be conducted which will yield FFE0.

So far we searched in machine cycles. In instruction cycles the first address is FFE0, hence the lower addresses must be read or write addresses. Incrementing the delay in instruction cycle steps yields the code and the mnemonic interpretation of Table II. Note that the second byte (variable at 2) sometimes shows the next instruction (in parenthesis) due to the pipelined organization. After FFEE we loop back to FFE4. We could continue tracing the loop endlessly by incrementing delay. Decrementing instead once, at FFEE there is a branch instruction. So if we transfer this to the match register, reset delay to zero, and switch to N+1, we see both branches executed at FFF0 and FFE4. After incrementing the match register, N+1 shows that here we always loop back to FFE2, it is an endless loop. We can double check this: the next address is never executed, the arm light stays on. Going back to FFE2, N−1 similarly shows two preceding instructions: one at FFE0, the other at FFF0. Incidentally by using N+1 or N−1 and transfer we can walk through the program forward or backward, following any branch we want.

Now the use of the breakpoint capability will be shown. Starting at FFE5 we can observe in the variable window the writing of data in the 00-FF range as the fifth machine cycle. When we single arm it manually, the numbers come up randomly, we do not know whether they are written in the right place in the right order. We could reset the processor at every strobe, put the delay in loop increments and watch the data sequence properly as we increase the delay loop by loop. Or we can halt the processor on write and single machine cycle step it 17 times with the Any/S.S. switch to see the next write. However, there is a better way. Matching as before, and changing the delay to five cycles, with halt we can observe the writing of every data at every location. The processor stops every time for a period adjustable by the arming rate control. Or we can manually arm and thereby step the processor in single loop, that is 7 instruction, increments very conveniently. The same result can be achieved by one lower match address and one higher cycle delay. There is a subtle reason why this is better.

If we now switch to loops followed by cycles delay (LP/CY) and add 01 loop to the 06 cycle delay, this we can do with the data switches and hi load, we can see every even number stored at every even location. If we would have stayed at FFE5 with delay 5 we would have to add two loop delays for the same result, since due to pipelining the match address is executed twice per loop.

By the same reasoning if we select 0F loop delay plus 06 cycles, we are able to see every write execution into a selected fixed location. That is we observe one chosen row of Table III. This is equivalent of stepping in 114 instrument cycle increments without ever having to compute that number. By delaying E loops (and still the 6 machine cycles) we see the rows scanned backward, but the columns forward. By increasing the delay to FF the same data written in the same place can be observed in 1821 instruction cycle increments. By the same token FE loop delay plus 6 cycle delay scans both rows and columns backward, the program flow is seemingly reversed. There are programs which are easier to trace backward than forward.

In the above examples we observed the writing process from the main program. Instead we could match on a write address by Transfer, and delay by one machine cycle to see all writes into that address consecutively. On the other hand we can not use some of the other discussed features within this match approach.

If there is a problem all the versatility is needed frequently just to decide whether the trouble is in software, microprocessor hardware, or in the external circuitry.

We have seen some of the flexibility of a single analyzer so far. However there is provision to interconnect any number of them. Complex trigger requirements, such as nested loops or subroutines can be easily examined if one analyzer arms another one. The synch or strobe output of the analyzer can arm one or more analyzers via the external arm or slave arm inputs. For example the exit from the $N_1$th loop of a subroutine called the $N_2$th time from the $N_3$th place can be easily traced and any trouble pinpointed with two analyzers. Chain arming can be implemented to any level of nesting.

The present invention can also be paralled indefinitely for wider match and wider display. Since the match can be tested on data, I/O or on control lines as well, there is another dimension of flexibility. Lastly there is provision for remote controlling every function and remote reading the display of the analyzer. The switches can be disabled and their terminals remotely controlled via a built-in connector. Under the control of a minicomputer or programmable calculator, this low cost analyzer thus could become a powerful automatic checkout tool for all microprocessor based systems. The remote controllability is a great help in the production test of the analyzer itself, the instrument can be checked out under microcomputer control in 12 seconds.

Besides serial arming and parallel matching other logic conditions can also be implemented using a multiplicity of analyzers. Each of several analyzers can arm another one to achieve ORed or exclusive ORed preconditions. Gates for this purpose are available at the rear connector of the analyzer.

Arming an analyzer by another one and disarming it by a third one can achieve "window" triggering: Match will be recognized only after Arm but before Disarm. Disarm can be implemented by remote reset or by pulling low Sync inputs 45 or 47.

Figure 9:
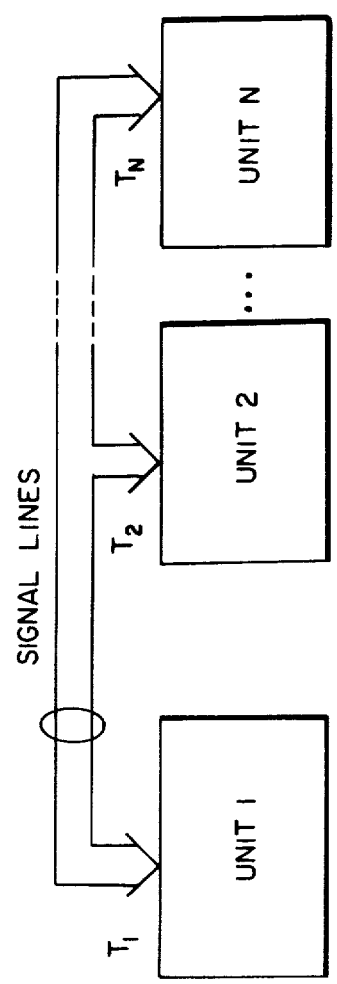
FIG. 9 is a block diagram showing the interconnection of several units.

FIG. 9 illustrates the concept where 1 through N units are interconnected to serve as a monitoring apparatus. Such interconnection is merely a multiline bus consisting of signal lines of the various units. These signal lines may include the address and data lines, and various other signal lines such as EQL OUT, EQL IN, HALT, CONT QUAL, HALT QUAL, EXT, ARM OUT, SLAVE ARM, RESET, BOC, A STROBE, B STROBE, and SYNC. Terminals of these signals are shown in FIGS. 3A through 5C.

For faster bipolar processors the clock frequency can be divided by a binary divider and two analyzers used to display odd or even addresses and data respectively.

The above examples are merely a few of the many microprocessor applications. However, the analyzer is not necessarily limited to this field since any bus oriented system such as a minicomputer or digital control system may be analyzed using the analyzer.

In the case of the search modes, the search to first and search to last are, of course, basically dependent on incrementing of the match register and the sensing of various equalities and inequalities. In the case of search to first, the analyzer increments the match register if there is no executed instruction. Thus, for example, starting at 0000 in response to no comparison the match register will be incremented or changed until the bit pattern in the match register which represents the state of the digital product at the time of comparison produces an equality.

In the case of search to last, an incrementing of the match register occurs only in response to an equal comparison since we are in effect incrementing through the sequential instruction or program steps. Then when a branch or gap occurs there is no longer any incrementing of the match register since there can be no equality. At this time the last consecutively executed instruction which has been obtained from the bus of the microprocessor remains stored in the memory or match register. This means that in the search to last, after every change in the match register the address is actually stored in the address memory 21'.

From a broad standpoint the analyzer of the present invention can be considered to have states $S_1$ through $S_X$ for events 1 through X. In the foregoing application example $S_1$ is the first state which may, for example, be the arming of the analyzer, and which is entered after $N_1$ times a first event; for example, this event might be a single external input signal where $N_1$ is equal to 1. After the arming the controller can cause the analyzer to enter a second state $S_2$ after the occurrence of $N_2$ times a second event. Referring to the application example, consider where there is a complex delay consisting of E loops and six machine cycles. Here the event 2 is a match. $N_2$ is hexidecimal E which is 14.

The last in the sequence in accordance with the example is delaying six machine cycles. This can be termed in its broadest sense $N_x$ times event X where X is "3". In other words, the $S_3$ strobe state will be entered after $N_3 = 6$ times the machine cycle event$_3$ occurs.

This $S_3$ state of one of the analyzers of the present invention can be used to arm a second analyzer (in other words, a chain is formed) which in effect produces an arm state in that analyzer. Loop and cycle delays in the second analyzer specify $N_4$ times event$_4$ and $N_5$ times event$_5$ causing the second analyzer to enter its $S_X$ state where X equals 5, and displays address and data at that point. The foregoing thus outlines the operation of one or more serially or chained interconnected analyzers. However, analyzers can also be paralleled for wider match capabilities such as where a combination of required data at a given address is necessary. For example, event 2 could be a 32 bit wide match.

As also discussed previously, at any strobe time when an event occurs, the microprocessor can be halted. Then after a halt, specific portions of the program can be stepped through one or more steps at a time. Stepping can also be accomplished by loops. And even more complex arrangements can be made where one halt can occur, there can be a complex sequence of events ending up in another state, and then a second halt can occur.

A universal address and data bus monitor has been disclosed. The architecture and operation has been covered, but there are innumerable application possibilities. It is anticipated that this microprocessor analyzer, in contrast with other hardware aids, will set a new standard of low cost, flexibility and ease in software and hardware trouble-shooting.

What is claimed is:

1. Apparatus for monitoring processor controlled digital equipment which is characterized by having timing cycles and generating predominantly sequential parallel multiline address signals on a bus, said apparatus comprising: incrementable register means for storing a register bit pattern representing an address; comparing means connected to said register means and to said bus for providing repetitive comparisons, in response to said timing cycles, between said register bit pattern and said multiline address signals of said digital equipment; means connecting said comparing means to the input of said register means for incrementing by a constant said address represented in said register means in response to each unequal comparison; and memory means connected to said bus to receive signals therefrom, said memory means serving to store in response to the first equal comparison an additional bit pattern which represents a state of said address signal on said bus, whereby the apparatus obtains information about the operation of said digital equipment.

2. Apparatus for monitoring processor controlled digital equipment which is characterized by having timing cycles and generating predominantly sequential parallel multiline address signals on a bus, said apparatus comprising: incrementable register means for storing a register bit pattern representing an address; comparing means connected to said register means and to said bus for providing repetitive comparisons, in response to said timing cycles, between said register bit pattern and said multiline address signals of said digital equipment; means connecting said comparing means to the input of said register means for incrementing by a constant said address represented in said register means in response to each equal comparison; and memory means connected to said bus to receive signals therefrom, said memory means serving to store in response to the first unequal comparison an additional bit pattern which represents a state of said address signal on said bus, whereby the apparatus obtains information about the operation of said digital equipment.

3. Multistate apparatus for monitoring digital equipment which is characterized by having timing cycles and generating at least one set of parallel multiline signals on a bus, said apparatus comprising: means for recognizing and counting $N_i$ times specific digital events, different for each i, on said bus called events$_i$, where "i" changes from 1 to x, said means for recognizing also sending signals to a controller means, connected to said means for recognizing, for causing said apparatus to enter consecutively an $S_1$ state after $N_1$ times event$_1$ has occurred, an $S_i$ state after $N_i$ times event$_i$ has occurred, and so on until the last $S_x$ state is entered after $N_x$ times event$_x$ has occurred, and where x and at least one $N_i$ are integers greater than 1; and memory means connected to said bus and controlled by said controller means for storing at least one bit pattern representative of the state of said signals on said bus of said digital equipment at the time of one of said events.

4. Apparatus as in claim 3 where said controller means prevents entry to an $S_i$ state unless event$_i$ has occurred all $N_i$ times during the previous state.

5. Apparatus as in claim 3 where said memory means is utilized to store at least one bit pattern representative of the state of said signals on said bus prior to the apparatus entering said last $S_x$ state.

6. Apparatus as in claim 3 wherein said memory means is utilized to store at least one bit pattern representative of the state of said signals on said bus subsequent to the apparatus entering said last $S_x$ state.

7. Apparatus as in claim 3 wherein said memory means is utilized to store at least one bit pattern representative of the state of said signals on said bus substantially coincidentally with the apparatus entering said last $S_x$ state.

8. Apparatus as in claim 3 together with means for halting, connected to said controller means and to said digital equipment, said means for halting serving to halt any change of said bus signals substantially coincidentally with said apparatus entering said last $S_x$ state.

9. Apparatus as in claim 3 together with means for resetting, connected to said controller means and to said digital equipment, said means for resetting serving to reset the operation of said digital equipment substantially coincidentally with said apparatus entering said last $S_x$ state.

10. Apparatus as in claim 3 together with means for interrupting, connected to said controller means and to said digital equipment, said means for interrupting serving to interrupt the operation of said digital equipment substantially coincidentally with said apparatus entering said last $S_x$ state.

11. Apparatus as in claim 8 together with means for causing, connected to said controller means and to said digital equipment, said means for causing serving to cause said digital equipment to resume operation for N timing cycles and then to halt again.

12. Apparatus as in claim 8 together with means for causing, connected to said controller means and to said digital equipment, said means for causing serving to cause said digital equipment to resume operation for N loop cycles and then to halt again.

13. Apparatus as in claim 8 together with means for causing, connected to said controller means and to said digital equipment, said means for causing serving to cause said digital equipment to resume operation until said last $S_x$ state of the apparatus is entered again.

14. Apparatus as in claim 3 together with means for causing, connected to said controller means and to said digital equipment, said means for causing serving to cause a display representing the state of the digital equipment at the time the apparatus is entering said last $S_x$ state.

15. Apparatus as in claim 3 together with means for causing, connected to said controller means and to said digital equipment, said means for causing serving to cause a display representing the state of said digital equipment prior to the time of said apparatus entering said last $S_x$ state.

16. Apparatus as in claim 3 together with means for causing, connected to said controller means and to said digital equipment, said means for causing serving to cause a display representing the state of said digital equipment subsequent to the time of said apparatus entering said last $S_x$ state.

17. Apparatus as in claim 11 together with timing generator means, connected to said controller means and to said digital equipment, said timing generator means serving to initiate the resumption of operation of said digital equipment.

18. Apparatus as in claim 3, wherein said digital event$_i$ is describable as a logical combination of one or more events on said bus and wherein the logical combination is defined as an expression including said one or more events together with one or more of operators AND, OR, EXCLUSIVE OR and NOT.

19. Apparatus for monitoring digital equipment which is characterized by having timing cycles and generating at least one set of parallel repetitive multiline signals on a bus, said apparatus comprising: first register means for storing a preselected first bit pattern; second means for storing a preselected second bit pattern with the ability for counting a preset number of repetitive cycles represented by said second bit pattern; controller means including comparator means connected to said first register means and to said bus for recognizing by generating a signal if the bit pattern stored in said first register means matches a bit pattern on the bus of said digital equipment, said controller means also causing by said signal said second means to count the number of said repetitive cycles occurring after said match until said preset number of repetitive cycles has elapsed, which event causes said controller means to enter a strobe state; memory means connected to said controller means and to said bus, said memory means storing an additional bit pattern representing the state of said multiline signals upon said controller means entering said strobe state; and means connected to said controller means and to said first register means for transferring on external command at least a portion of the current stored bit pattern into said first register means.

20. Apparatus for monitoring digital equipment which has timing cycles and generates at least one set of parallel multiline signals on a bus, said apparatus comprising means for recognizing digital events in said digital equipment, means for generating a strobe signal at a next specified event forming an external command, and memory means connected to said bus for storing a bit pattern representing the state of said multiline signals at the time of said strobe signal, wherein said specified event is the Nth occurrence, where N is an integer greater than one, of a predetermined bit pattern on the bus of said digital equipment followed by a predetermined number of said timing cycles.

21. Apparatus for monitoring processor controlled digital equipment which is characterized by having timing cycles and generating at least one set of parallel multiline signals on a bus, said apparatus comprising: a plurality of units numbered from 1 to N, N larger than 1, each including: preselecting means; first register means, connected to said preselecting means, for storing a first bit pattern selected by said preselecting means; second register means, connected to said preselecting means, for storing a second bit pattern selected by said preselecting means, said second register means also serving to count a preset number of timing cycles, said preset number being represented by said second bit pattern; controller means connected to said first and second register means and to said bus, said controller means being activated upon receiving an arming signal, said controller means including comparator means for recognizing, by entering a matched state, when the bit pattern stored in said first register means matches the bit pattern on the bus of said digital equipment, said controller means also causing said second register means to count the number of said timing cycles occurring after said matched state until said preset number of timing cycles has occurred, whereupon said controller means generates a strobe signal; each of said units having arming means input for receiving said arming signal and having strobe output means for outputting said strobe signal, and interconnecting means for connecting said strobe signal output of one of a lower numbered unit to said arming means input of another higher numbered unit, thereby causing each higher numbered unit to start operation after the generation of the strobe signal by the lower numbered unit.

22. Apparatus for monitoring digital equipment having timing cycles and generating at least one set of parallel bit patterns on a bus, said apparatus comprising: memory means; register means for storing an externally preselected first bit pattern and first and second numbers; and controller means, connected to said memory means to said register means, and to said bus, said controller means including comparator means for recognizing, by generating an output signal, when the bit pattern stored in said register means matches the bit pattern on said bus, said controller means including counting means for counting the recurrence of said output signal until it equals said first number and thereafter counting the number of said timing cycles until it equals said second number, thereupon said controller means causing said memory means to store at least one bit pattern representative of at least one bit pattern representative of at least one state of said multiline signals.

23. Apparatus as in claim 22 together with display means connected to said controller means for displaying the equivalent of said at least one bit pattern.

* * * * *